(12) United States Patent
Chen et al.

(10) Patent No.: US 7,558,461 B2
(45) Date of Patent: Jul. 7, 2009

(54) HIGH SBS THRESHOLD OPTICAL FIBER WITH ALUMINUM DOPANT

(75) Inventors: Xin Chen, Corning, NY (US); Stuart Gray, Corning, NY (US); Ming-Jun Li, Horseheads, NY (US); Daiping Ma, Wilmington, NC (US); Daniel Aloysius Nolan, Corning, NY (US); Alranzo Boh Ruffin, Painted Post, NY (US); Donnell Thaddeus Walton, Painted Post, NY (US); Ji Wang, Painted Post, NY (US)

(73) Assignee: Corning Incorporated, Corning, NY (US)

(*) Notice: Subject to any disclaimer, the term of this patent is extended or adjusted under 35 U.S.C. 154(b) by 183 days.

(21) Appl. No.: 11/453,450

(22) Filed: Jun. 14, 2006

(65) Prior Publication Data

US 2007/0116416 A1    May 24, 2007

Related U.S. Application Data

(60) Provisional application No. 60/691,180, filed on Jun. 15, 2005.

(51) Int. Cl.
*G02B 6/00* (2006.01)
(52) U.S. Cl. .................................. 385/142
(58) Field of Classification Search ............... None
See application file for complete search history.

(56) References Cited

U.S. PATENT DOCUMENTS

| | | | |
|---|---|---|---|
| 4,348,275 A | 9/1982 | Backman | 209/310 |
| 4,913,521 A | 4/1990 | Tajima et al. | 350/96.33 |
| 6,542,683 B1 | 4/2003 | Evans et al. | 385/127 |
| 6,587,623 B1 | 7/2003 | Papen et al. | 385/123 |
| 6,687,440 B2 | 2/2004 | Balestra et al. | 385/123 |
| 6,766,075 B1 | 7/2004 | King et al. | 385/31 |
| 6,856,740 B2* | 2/2005 | Balestra et al. | 385/123 |
| 6,959,022 B2 | 10/2005 | Sandrock et al. | 372/6 |
| 2003/0235368 A1 | 12/2003 | Kulishov et al. | 385/40 |
| 2004/0009617 A1 | 1/2004 | Masuda et al. | 438/5 |
| 2006/0093294 A1* | 5/2006 | Manyam et al. | 385/123 |

OTHER PUBLICATIONS

"Single-Mode Fiber Optics" (Principles and Applications); Luc Jeunhomme; pp. 39-44; Marcel Dekker, NY 1990.
"Thermo-optical properties of air-clad photonic crystal fiber lasers in high power operation"; J. Limpert et al; Nov. 3, 2003; vol. 11, No. 22; Optics Express, 2003.
"500 W continuous-wave fibre laser with excellent beam quality"; J. Limpert et al; Electronics Letters, Apr. 17, 2003; vol. 39, No. 8; p. 645-647.
"Simulating and Designing Brillouin Gain Spectrum in Single-Mode Fibers"; Y. Koyamada et al; Journal of Lightwave Technology; vol. 2; No. 2; Feb. 2004; p. 631-639.
"Optical Fiber with an Acoustic Guiding Layer for Stimulated Brillouin Scattering Suppression"; Peter D. Dragic et al; CLEO '2005, paper CTh23, Baltimore, Maryland, May 22-27, 2005.
"Recent advances in high power fiber lasers"; J. Sahu et al; Advanced Solid State Photonics; p. MA1, OSA, (Santa Fe, NM), 2004.

* cited by examiner

*Primary Examiner*—Uyen-Chau N Le
*Assistant Examiner*—Chris Chu
(74) *Attorney, Agent, or Firm*—Svetlana Z. Short

(57) ABSTRACT

An optical fiber comprising a core having a refractive index profile and a centerline; and a cladding layer surrounding and directly adjacent the core; wherein core includes updoping material and is doped with Aluminum in at least one region of the core, such that either: (a) the average longitudinal acoustic wave velocity within the core is within 0.05% of the longitudinal acoustic wave velocity within the cladding; or (b) the longitudinal acoustic wave velocity in the core changes by at least 0.2%.

22 Claims, 13 Drawing Sheets

HIGH SBS THRESHOLD OPTICAL FIBER WITH ALUMINUM DOPANT

This application claims the benefit of priority under 35 U.S.C. § 119(e) of U.S. Provisional Application Ser. No. U.S. 60/691,180 filed on Jun. 15, 2005.

Parts of this invention were made with Government support under Agreement No. MDA972-02-3-004 awarded by DARPA. The Government may have certain rights in some of the claims of the invention.

BACKGROUND OF THE INVENTION

1. Field of the Invention

The present invention relates to high SBS threshold optical fibers.

2. Technical Background

Stimulated Brillouin Scattering (SBS) is a dominant non-linear penalty in many optical transmission systems. In many systems, it is desirable to transmit large optical power through optical fibers, while maintaining high signal to noise ratio (SNR). However, as the power of the incident optical signal launched into an optical fiber increases, it may exceed a certain threshold power (SBS threshold) and part of the signal power will then be reflected back due to SBS. Thus, due to SBS, a large amount of the signal power can be lost due to reflection back toward the transmitter. In addition, the scattering process increases the noise level at the signal wavelength. The combination of decrease in signal power and increase in the noise both lower the SNR and lead to performance degradation.

At finite temperatures, thermal excitations in glasses occur similarly to that of phonons in crystals, and the interaction of these vibrational modes with low intensity signal light produces spontaneous Brillouin scattering. An intense optical field generates pressure or sound waves through electrostriction due to the beating of intense incident and spontaneous reflected light, giving rise to pressure or acoustic waves. The change in pressure causes material density to change, thereby resulting in refractive index fluctuations. The net result is that an intense electrical field component of the optical wave generates pressure or sound (acoustic) waves which cause material density fluctuations. The acoustic wave changes the refractive index and enhances the reflected light amplitude through Bragg diffraction. Above the SBS threshold of an optical fiber, the number of stimulated photons is very high, resulting in a strong reflected field which limits the optical power that is transmitted, and which reduces the SNR.

U.S. Pat. Nos. 6,856,740 and 6,687,440 disclose the use of acoustic wave anti-guiding to reduce SBS. This is achieved by an optical fiber core that is doped such that the longitudinal acoustic velocity of the fiber core is higher than that of the cladding. (That is, "the effective index of refraction" for the acoustic wave is lower than that of the cladding.) However, our analysis showed that this technique will have limited utility because acoustic cladding modes become prevalent in the absence of core modes. The acoustic cladding modes then couple into the core, creating SBS and establishing the SBS threshold. Furthermore, one technique for achieving acoustic wave anti-guiding within the fiber core utilizes special coatings. The low damage threshold of such coatings precludes the use of such fiber in high optical power applications.

US patent application No 2004/009617 and U.S. Pat. No. 6,587,623 also disclose a similar SBS reduction technique. These references are directed to SBS reduction via reduction of the acoustic core modes, by allowing acoustic modes to propagate in the fiber cladding. Again, this approach fails to consider acoustic cladding modes which couple into the fiber core and then become confined inside the core, where they overlap with optical modes and play a major role in the SBS threshold. Furthermore, these references focus on shear velocity when longitudinal acoustic velocity is known to be the dominant parameter in SBS.

U.S. Pat. No. 6,542,683 discloses that the SBS effect is mitigated by an optical fiber with a core with both radially nonuniform viscosity and non-uniform CTE provided by alternating different layers of glass, via modifying dopants such as phosphorous and fluorine. The patent teaches that the thickness of the alternating layers should be less than 0.5 μm, and the co-dopants between two adjacent layers are different by at least one composition.

The paper by Y. Koyamada et al. (J. of Lightwave Technology, vol. 22, pp. 631-639, 2004) discloses a method of suppressing acoustic modes propagating in the fiber core by making the longitudinal acoustic velocity in the core higher than in the cladding. This is achieved by doping the fiber cladding with Fluorine, thereby decreasing the cladding's refractive index while lowering acoustic velocity within the cladding. The amount of Ge in the core was decreased to provide the appropriate delta, relative to the cladding. The paper teaches for the fiber with a 1 μm radius (Ge doped) core with the very high refractive index delta (3.7% delta relative to the cladding) and Fluorine doped cladding, minimum SBS (high SBS threshold) occurs when the longitudinal acoustic velocity difference between the core and cladding is 0.03.

The paper by P. D. Dragic et al. (CLEO'2005, paper CThZ3, Baltimore, Md., May 22-27, 2005) discloses a fiber design with a ring shaped acoustic field guiding layer that surrounds the core. However, this design did not account for the acoustic cladding modes, which can coupled into the core region, creating SBS and establishing the SBS threshold. The experimental results reported in the paper show that the fiber attenuation is much higher than the standard single mode fiber, which is not desirable for fiber laser applications.

SUMMARY OF THE INVENTION

Disclosed herein is an optical waveguide fiber having a high threshold for stimulated Brillouin scattering. According to some embodiments of the invention, the optical fiber comprises:

a core having a refractive index profile and a centerline; and a cladding layer surrounding and directly adjacent the core;

wherein core includes updoping material and is doped with Aluminum in at least one region of the core, such that either:

(a) the average longitudinal acoustic wave velocity within the core is within 0.05% of the longitudinal acoustic wave velocity within the cladding; or (b) the longitudinal acoustic wave velocity in the core changes by at least 0.2%.

According to some embodiments, the optical fiber comprises:

an Aluminum doped core having a refractive index profile and a centerline, the core comprising a first region having an acoustic relative refractive index $\Delta_1$ and a second region directly adjacent the first region and having a relative acoustic refractive index $\Delta_2$ wherein $\Delta_1$ does not equal to $\Delta_2$, said two core regions having a substantially equal optical relative refractive index, and a cladding layer surrounding and directly adjacent the core;

wherein the optical fiber has an attenuation at 1550 nm;

wherein the refractive index of the core is selected to provide an overlap integral less than 0.8 at 1550 nm.

According to some embodiments, the optical fiber comprises:

an Aluminum doped core having a refractive index profile and a centerline, the core comprising a first region having an acoustic relative refractive index $\Delta_1$ and a second region directly adjacent the first region and having a relative acoustic refractive index $\Delta_2$ wherein $\Delta_1$ does not equal to $\Delta_2$, said two core regions having a substantially equal optical relative refractive index, and a cladding layer surrounding and directly adjacent the core; wherein one of first region has more than 0.1 mole % Aluminum and said second region has less than 0.1 mole % of Aluminum, and at least one of said regions is co-doped with G and Aluminum.

In one group of embodiments one of the core regions includes Ge doped silica and the adjacent core region includes Ge and Aluminum doped silica. For example, the central core region may include Ge doped silica and the adjacent core region surrounding the central core region includes-Ge and Aluminum doped silica. In another example, the central core region includes Ge and Aluminum co-doped silica and the adjacent core region surrounding the central core region includes Ge doped silica and does not include Aluminum doped silica. In yet another example both regions are doped with both Ge and Aluminum, herein the amounts of Ge and Aluminum are different in these two regions. It is preferable that the cladding layer be a pure silica layer or a aluminum doped silica.

Preferably, the embodiments of the optical fiber described and disclosed herein allow suitable performance at a plurality of operating wavelength windows between about 800 nm and about 1650 nm. For example, some of the embodiments of the optical fiber described and disclosed herein allow suitable performance at a plurality of wavelengths from about 1260 nm to about 1650 nm. In some of the embodiments of the optical fiber of this type, the optical fibers described and disclosed herein can accommodate operation in at least the 1310 nm centered window and the 1550 nm centered window. The exemplary laser fiber embodiments operate preferably in the 900 nm and 1600 nm range, for example at about 1080 nm.

Reference will now be made in detail to the present preferred embodiments of the invention, examples of which are illustrated in the accompanying drawings.

BRIEF DESCRIPTION OF THE DRAWINGS

FIG. 2b illustrates the longitudinal acoustic delta profile of the standard single mode optical of FIG. 2a;

FIG. 2c is a plot of optical and longitudinal acoustic fields of the optical fiber of FIG. 2a;

FIG. 3b illustrates schematically the longitudinal acoustic delta profile of the optical fiber according to the present invention that has the optical delta profile shown in FIG. 3a;

FIG. 19 is a plot of the longitudinal acoustic velocity through the core and cladding of an optical fiber according to one embodiment of the present invention that has the optical delta profile of FIG. 2a;

DETAILED DESCRIPTION OF THE EMBODIMENTS

Figure 1:
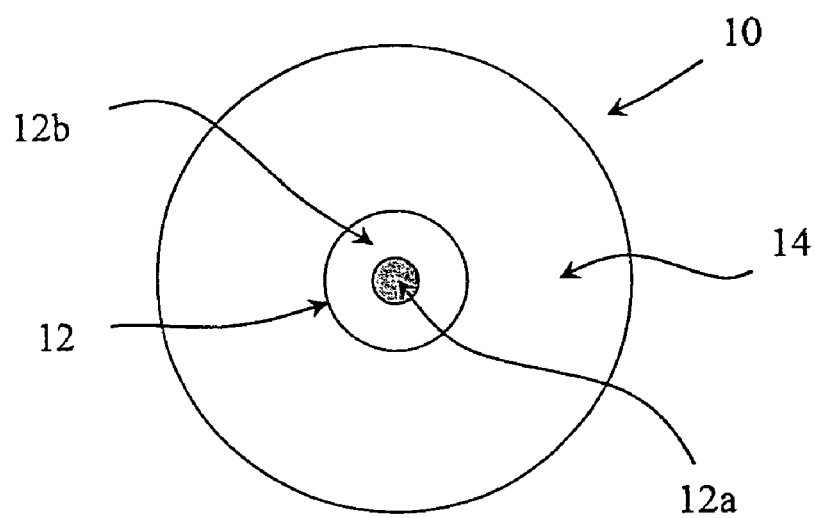
FIG. 1 illustrates a schematic cross-sectional view of one embodiment of the optical fiber according to the present invention.

Additional features and advantages of the invention will be set forth in the detailed description which follows and will be apparent to those skilled in the art from the description or recognized by practicing the invention as described in the following description together with the claims and appended drawings.

The "refractive index profile" is the relationship between refractive index or relative refractive index and waveguide fiber radius.

The "relative refractive index percent" or "optical refractive index delta" is defined as $\Delta\% = 100 \times (n_i^2 - n_c^2)/2n_i^2$, where $n_i$ is the maximum refractive index in region i, unless otherwise specified, and $n_c$ is the average refractive index of the cladding region. As used herein, the relative refractive index is represented by $\Delta$ and its values are given in units of "%", unless otherwise specified. In cases where the refractive index of a region is less than the average refractive index of the cladding region, the relative index percent is negative and is referred to as having a depressed region or depressed index, and is calculated at the point at which the relative index is most negative unless otherwise specified. In cases where the refractive index of a region is greater than the average refractive index of the cladding region, the relative index percent is positive and the region can be said to be raised or to have a positive index. An "updopant" is herein considered to be a dopant which has a propensity to raise the refractive index relative to pure undoped $SiO_2$. A "downdopant" is herein considered to be a dopant which has a propensity to lower the refractive index relative to pure undoped $SiO_2$. An updopant may be present in a region of an optical fiber having a negative relative refractive index when accompanied by one or more other dopants which are not updopants. Likewise, one or more other dopants which are not updopants may be present in a region of an optical fiber having a positive relative refractive index. A downdopant may be present in a region of an optical fiber having a positive relative refractive index when accompanied by one or more other dopants which are not downdopants. Likewise, one or more other dopants which are not downdopants may be present in a region of an optical fiber having a negative relative refractive index.

"Chromatic dispersion", herein referred to as "dispersion" unless otherwise noted, of a waveguide fiber is the sum of the material dispersion, the waveguide dispersion, and the inter-modal dispersion. In the case of single mode waveguide fibers the inter-modal dispersion is zero. Zero dispersion wavelength is a wavelength at which the dispersion has a value of zero. Dispersion slope is the rate of change of dispersion with respect to wavelength "Effective area" is defined as:

$$A_{eff}=2\pi(\int f^2(r)rdr)/(\int f^4(r)rdr)$$

where the integration limits are 0 to $\infty$, and f(r) is the transverse component of the electric field associated with light propagated in the waveguide. As used herein, "effective area" or "$A_{eff}$" refers to optical effective area at a wavelength of 1550 nm unless otherwise noted.

The term "$\alpha$-profile" refers to a relative refractive index profile, expressed in terms of $\Delta(r)$ which is in units of "%", where r is radius, which follows the equation, $$\Delta(r)=\Delta(r_0)(1-[|r-r_0|/(r_1-r_0)]^\alpha),$$

where $r_0$ is the point at which $\Delta(r)$ is maximum, $r_1$ is the point at which $\Delta(r)$ % is zero, and r is in the range $r_i \leq r < r_f$, where $\Delta$ is defined above, $r_i$ is the initial point of the $\alpha$-profile, $r_f$ is the final point of the $\alpha$-profile, and $\alpha$ is an exponent which is a real number.

The mode field diameter (MFD) is measured using the Peterman II method wherein, 2w=MFD, and $w^2=(2\int f^2(r)rdr/\int [df(r)/dr]^2 rdr)$, the integral limits being 0 to $\infty$.

The bend resistance of a waveguide fiber can be gauged by induced attenuation under prescribed test conditions.

One type of bend test is the lateral load microbend test. In this so-called "lateral load" test, a prescribed length of waveguide fiber is placed between two flat plates. A #70 wire mesh is attached to one of the plates. A known length of waveguide fiber is sandwiched between the plates and a reference attenuation is measured while the plates are pressed together with a force of 30 newtons. A 70 newton force is then applied to the plates and the increase in attenuation in dB/m is measured. The increase in attenuation is the lateral load attenuation of the waveguide.

The "pin array" bend test is used to compare relative resistance of waveguide fiber to bending. To perform this test, attenuation loss is measured for a waveguide fiber with essentially no induced bending loss. The waveguide fiber is then woven about the pin array and attenuation again measured. The loss induced by bending is the difference between the two measured attenuations. The pin array is a set of ten cylindrical pins arranged in a single row and held in a fixed vertical position on a flat surface. The pin spacing is 5 mm, center to center. The pin diameter is 0.67 mm. During testing, sufficient tension is applied to make the waveguide fiber conform to a portion of the pin surface.

The theoretical fiber cutoff wavelength, or "theoretical fiber cutoff", or "theoretical cutoff", for a given mode, is the wavelength above which guided light cannot propagate in that mode. A mathematical definition can be found in Single Mode Fiber Optics, Jeunhomme, pp. 39-44, Marcel Dekker, New York, 1990 wherein the theoretical fiber cutoff is described as the wavelength at which the mode propagation constant becomes equal to the plane wave propagation constant in the outer cladding. This theoretical wavelength is appropriate for an infinitely long, perfectly straight fiber that has no diameter variations.

The effective fiber cutoff is lower than the theoretical cutoff due to losses that are induced by bending and/or mechanical pressure. In this context, the cutoff refers to the higher of the optical $LP_{11}$ and $LP_{02}$ modes. $LP_{11}$ and $LP_{02}$ are generally not distinguished in measurements, but both are evident as steps in the spectral measurement, i.e. no power is observed in the mode at wavelengths longer than the measured cutoff. The actual fiber cutoff can be measured by the standard 2 m fiber optical cutoff test, FOTP-80 (EIA-TIA-455-80), to yield the "fiber cutoff wavelength", also known as the "2 m fiber cutoff" or "measured cutoff". The FOTP-80 standard test is performed to either strip out the higher order modes using a controlled amount of bending, or to normalize the spectral response of the fiber to that of a multimode fiber.

The cabled cutoff wavelength, or "cabled cutoff" is even lower than the measured fiber cutoff due to higher levels of bending and mechanical pressure in the cable environment. The actual cabled condition can be approximated by the cabled cutoff test described in the EIA-445 Fiber Optic Test Procedures, which are part of the EIA-TIA Fiber Optics Standards, that is, the Electronics Industry Alliance-Telecommunications Industry Association Fiber Optics Standards, more commonly known as FOTP's. Cabled cutoff measurement is described in EIA-455-170 Cable Cutoff Wavelength of Single-mode Fiber by Transmitted Power, or "FOTP-170".

Kappa is the ratio of dispersion divided by dispersion slope at a particular wavelength. Unless otherwise noted herein, kappa is reported at a wavelength of 1550 nm.

Unless otherwise noted herein, optical properties (such as dispersion, dispersion slope, etc.) are reported for the LP01 mode.

A waveguide fiber telecommunications link, or simply a link, is made up of a transmitter of light signals, a receiver of light signals, and a length of waveguide fiber or fibers having respective ends optically coupled to the transmitter and receiver to propagate light signals there between. The length of waveguide fiber can be made up of a plurality of shorter lengths that are spliced or connected together in end to end series arrangement. A link can include additional optical components such as optical amplifiers, optical attenuators, optical isolators, optical switches, optical filters, or multiplexing or demultiplexing devices. One may denote a group of inter-connected links as a telecommunications system.

A span of optical fiber as used herein includes a length of optical fiber, or a plurality of optical fibers fused together serially, extending between optical devices, for example between two optical amplifiers, or between a multiplexing device and an optical amplifier. A span may comprise one or more sections of optical fiber as disclosed herein, and may further comprise one or more sections of other optical fiber, for example as selected to achieve a desired system performance or parameter such as residual dispersion at the end of a span.

Various wavelength bands, or operating wavelength ranges, or wavelength windows, can be defined as follows: "1310 nm band" is 1260 to 1360 nm; "E-band" is 1360 to 1460 nm; "S-band" is 1460 to 1530 nm; "C-band" is 1530 to 1565 nm; "L-band" is 1565 to 1625 nm; and "U-band" is 1625 to 1675 nm.

When an optical wave propagates in an optical waveguide in which acoustic modes are present, the optical wave is scattered by the acoustic wave. The electric field that describes the SBS satisfies the nonlinear wave equation:

$$\nabla^2 \tilde{E} = \mu_0 \varepsilon_0 \varepsilon \frac{\partial^2 \tilde{E}}{\partial t^2} + \mu_0 \frac{\partial^2 \tilde{P}_{NL}}{\partial t^2} \qquad (1)$$

$$\tilde{P}_{NL} = \frac{\gamma}{\rho_0} \tilde{\rho} \tilde{E} \qquad (2)$$

where $\varepsilon = \varepsilon_r - i\varepsilon_i$ is complex dielectric constant, $P_{NL}$ is the nonlinear polarization due to the interaction between the electrical field and acoustic field, $\rho_0$ is the material density, $\tilde{\rho}$ is the density fluctuation caused by the acoustic wave, which satisfies the nonlinear acoustic wave equation:

$$\frac{\partial^2 \tilde{\rho}}{\partial t^2} = \left(V_L^2 + \Gamma \frac{\partial}{\partial t}\right)\nabla^2 \tilde{\rho} - \frac{\gamma}{2}\nabla^2 \tilde{E}^2 \qquad (3)$$

where $\gamma$ is electrostrictive coefficient, $\Gamma$ is the damping factor, and $V_L$ is the longitudinal acoustic velocity. The electric field can be written in the following form:

$$\tilde{E} = A_p(z)E_p(r,\theta)e^{i(\omega_p t - \beta_p z)} + A_s(z)E_s(r,\theta)e^{i(\omega_s t + \beta_s z)} + c.c. \qquad (4)$$

where $E_j$ (j=p,s) is the transverse electric filed distribution that satisfies the mode equation $$\nabla_t^2 E_j + (\mu_0 \varepsilon_0 \varepsilon_r \omega_j^2 - \beta_j^2) E_j = 0 \qquad (5)$$

$\omega_j$ (j=p,s) is the optical frequency, $\beta_j$ (j=p,s) is the optical propagation constant, p denotes the pump signal, and s denotes the Brillouin scattering signal. Without the electric field, the acoustic wave equation has a set of modal solutions $\rho_\mu$. With the electric field in Eq. (4), we assume a solution of the following form $$\tilde{\rho} = \sum_u A_u(z)\rho_u(r,\theta)e^{i(\Omega_u t - B_u z)} + c.c. \qquad (6)$$

where $\Omega$ is the acoustic frequency and the B is the propagation constant of the acoustic mode. Neglecting the damping factor, the mode $\rho_\mu$ satisfies $$\nabla_t^2 \rho_u + \left(\frac{\Omega_u^2}{V_L^2} - B_u^2\right)\rho_u = 0 \qquad (7)$$

From the above equations we can derive the equations for the optical power changes for the pump and the signal:

$$\frac{dP_p}{dz} = -\alpha_0 P_p - \sum \frac{1}{2}[g_u(e^{i\Delta\beta_u z - \alpha_u z} - 1) + g_u^*(e^{-i\Delta\beta_u z - \alpha_u z} - 1)]P_p P_s \qquad (8)$$

$$\frac{dP_s}{dz} = \alpha_0 P_s - \sum \frac{1}{2}[g_u(e^{i\Delta\beta_u z - \alpha_u z} - 1) + g_u^*(e^{-i\Delta\beta_u z - \alpha_u z} - 1)]P_p P_s \qquad (9)$$

where $g_u$, is the SBS gain coefficient due to acoustic mode number u $$g_u = \frac{g_0 \bar{I}_u^{ao}}{(\alpha_u - i\Delta\beta_u)KA_{eff}} \qquad (10)$$

where $g_0$ is a parameter determined by the material, au is the loss of the acoustic mode, Dbu is the phase mismatch between the acoustic and optical modes, $A_{eff}$ is optical effective area, $$A_{eff} = \frac{\left(\int E_0 E_0^* r dr d\theta\right)^2}{\int (E_0 E_0^*)^2 r dr d\theta} \qquad (11)$$

and $\bar{I}_u^{ao}$ is the normalized overlap integral between the electric and acoustic fields $$\bar{I}_u^{ao} = \frac{\left(\int E_0 E_0^* \rho_u r dr d\theta\right)^2}{\int (E_0 E_0^*)^2 r dr d\theta \int \rho \rho^* r dr d\theta} \qquad (12)$$

Equation (10) shows that the SBS gain coefficient depends on two parameters that related to fiber design: one is the optical effective area $A_{eff}$, the other is the overlap integral $\bar{I}_u^{ao}$. To reduce the SBS effect, one can increase the optical effective area (thus reducing optical power density), or decrease the overlap integral.

To capture the effects from both the optical effective area and the overlap integral, we define a figure of merit (FOM) by taking the ratio of optical effective area over the overlap integral:

$$F = \frac{A_{eff}}{\bar{I}_u^{ao}} \qquad (13)$$

The figure of merit (FOM) can be used to gauge the SBS improvement from one optical fiber (reference fiber) to another optical fiber.

The SBS power grows exponentially with fiber length. For uniform Brillouin frequency shift along the fiber, the peak SBS power threshold is inversely proportional to the gain coefficient and fiber effective length:

$$P \propto \frac{1}{g_u L_{eff}} = \frac{K\alpha_u A_{eff}}{g_0 \overline{I}_u^{ao} L_{eff}} = \frac{K\alpha_u F}{g_0 L_{eff}} \quad (14)$$

where $L_{eff}$ is the effective length of fiber defined by $$L_{eff} = \frac{1 - e^{-\alpha_o L}}{\alpha_o},$$

where $\alpha_o$, is the optical attenuation coefficient and L is the fiber length.

In order to improve the SBS performance of an optical fiber, the figure of merit F should be designed to take a larger value than a conventional fiber without the optimized performance in SBS. The ratio of the F of the fiber being designed to that of a reference fiber is the factor that the SBS threshold is improved. It is also converted into dB unit as described in this invention disclosure.

It can be seen from Equations (5) and (7) that the optical field and longitudinal acoustic field are governed by similar type of scalar wave equations. The two equations can be written in the same form for the fundamental optical mode and the acoustic mode with no azimuthal variation that are involved in the SBS $$\frac{d^2 f_o}{dr^2} + \frac{1}{r}\frac{df_o}{dr} + k_o^2(n_0^2(r) - n_{oeff}^2)f_o = 0 \quad (15a)$$

$$\frac{d^2 f_a}{dr^2} + \frac{1}{r}\frac{df_a}{dr} + k_a^2(n_a^2(r) - n_{aeff}^2)f_a = 0 \quad (15b)$$

where the subscript o stands for the optical field and subscript a stands for the acoustic field. For an optical mode, $f_o$ is the optical field distribution, $n_o(r)$ describes the refractive index as a function of the radial position, and $k_o$ is the optical wave number, which is linked to the optical wavelength by $2\pi/\lambda$.

For an acoustic mode, $f_a(r)$ is the acoustic field distribution and the acoustic refractive index is defined as $$n_a(r) = \frac{V_{clad}}{V_L(r)}, \quad (16)$$

and $$k_a = \frac{2\pi}{\lambda/(2n_{oeff})} = \frac{2\pi}{\lambda'} \quad (17)$$

where $\lambda'$ is the acoustic wavelength.

In practice, the (optical) refractive index profile is often described by the optical delta profile or optical refractive index delta profile. We can also similarly define the delta for the acoustic refractive index so that each optical refractive index profile is also associated with a corresponding acoustic delta profile that describes the (longitudinal) acoustic behavior of longitudinal acoustic field. Using the index definitions for the optical and acoustic waves, we can describe the optical and acoustic delta profiles using the following equation:

$$\Delta_o = \frac{n_o^2(r) - n_{oc}^2}{2n_o^2(r)} \times 100\%, \quad (18)$$

$$\Delta_a = \frac{n_a^2(r) - n_{ac}^2}{2n_a^2(r)} \times 100\%$$

where subscript "o" stands for optical wave and "a" stands for acoustic wave, and "c" denotes the index for the cladding.

The optical refractive index of the core as the function of the Ge doping concentration is described by the following equation, $$n(w_{Ge}, w_{Al}) = n_o(1 + 1.0e - 3 * w_{Ge} + 1.1888e - 3 * w_{Al}) \quad (19),$$

where $w_{GeO2}$ is the mole percent of the Ge dopant, and $w_{Al2O3}$ is the mole percent of the aluminum dopant. It is clear that the both the Ge and Aluminum doping contribute to the increase the refractive index from that of pure silica The role of the Ge and Aluminum doping on the longitudinal acoustic velocity takes the following form, $$V_L(w_{Ge}, w_{Al}) = 5944(1 - 7.2e - 3 * w_{Ge} + 6.8e - 3 * w_{Al}) \quad (20),$$

where the longitudinal acoustic velocity is in the unit of m/s.

An optical waveguide fiber which is optically single-moded at a particular wavelength may be multi-moded acoustically at the same optical wavelength (assuming $\lambda=1.55$ μm) because the acoustic wavelength corresponding to Brillouin frequency is of the order of 0.55 microns, which is quite small compared to typical optical waveguide fiber dimensions. (See Eqs. (16) and (17).) In the case of spontaneous Brillouin scattering at relatively low launch powers, the incident optical field is Brillouin scattered by each of the acoustic modes and Brillouin gain spectrum shows peaks corresponding to optical field interaction with each of the acoustic modes. At relatively high launch powers, the SBS threshold is exceeded, and one of the acoustic modes typically becomes dominant while the other acoustic modes do not survive the mode competition, leading to the onset of stimulated Brillouin scattering.

As coupling between the optical mode field and the acoustic mode field(s) increases, more optical power is undesirably reflected opposite to the direction of optical signal transmission.

As disclosed herein, the coupling between the optical and acoustic modes is preferably reduced via the refractive (i.e., optical) and acoustic index profiles of the optical fiber disclosed herein. In some embodiments, optical mode field remains extended while acoustic fields become more tightly confined to one region of the core to reduce overlap between the optical mode field and the acoustic fields. In some embodiments the confinement of acoustic power in the core is reduced by spreading the acoustic field, which is achieved by matching the acoustic velocity in the core and cladding (i.e., making theses velocities the same or essentially the same).

Thus, in some of the embodiments of the present invention, the optical fiber 10 disclosed herein (see FIG. 1) tends to pull the mode field of the dominant acoustic mode field (for example, $L_{01}$) either (a) in toward the centerline of the optical fiber, or (b) outward towards the edge of the core 12, resulting in reduced coupling between the acoustic and optical fields. Preferably, the optical fiber 10 also tends to pull the mode field of the next dominant acoustic mode field (typically $L_{02}$) either (a) in toward the centerline of the optical fiber, or (b) outward towards the edge of the core, resulting in reduced coupling between this next dominant acoustic mode field and the optical field. In the other embodiments, the acoustic velocity of the core and the cladding are about the same, and the acoustic field extends over the cladding, leaving much less acoustic energy in the core, again minimizing the overlap integral between the optical and acoustic fields.

The Brillouin frequency for optical fiber as disclosed herein is preferably between about 9.5 to 12 GHz, for the 1550 nm wavelengths (and is higher when measured at shorter wavelengths).

We have found that a higher dopant concentration of the materials that reduce acoustic field velocity (for example Ge), at or near the optical fiber centerline, and in particular in a central portion of the core of the optical fiber, than that in the region away from the central core that has more Al dopant, forces the acoustic modes to be more tightly confined in that central core region (core region 12a). Higher concentration of Al dopant near the central core increases the longitudinal acoustic velocity in that region and shifts acoustic modes toward the edge of the core (region 12b).

Preferably, the core is comprised of silica doped with an optical index (of refraction) raising dopant, for example germanium, i.e. germania doped silica. At least one section of the core is also co-doped with Aluminum—i.e., it includes both Ge and Aluminum. Germania increases the optical refractive index while decreasing longitudinal acoustic velocity of the acoustic wavefront (thereby increasing "effective refractive index" of the acoustic wave). Aluminum increases the optical refractive index while also increasing longitudinal acoustic velocity of the acoustic (sound) wavefront (thereby decreasing the "effective refractive index" of the acoustic wave). Having at least one section of the core co-doped with both Ge and Aluminum achieves the desired optical refractive index (or refractive index delta) while changing the longitudinal acoustic velocity of the core, thus resulting in decreased overlap between the acoustic wave (field) and the optical wave (or field), decreasing the SBS. This approach allows us to keep the desired optical profile without changing the optical properties, while simultaneously changing/controlling the acoustic wave velocity and minimizing or eliminating SBS.

The core may comprise a first portion (core region 12a) extending from the centerline to a radius of about 2 µm. Alternatively the core may comprise a first portion (core region 12a) extending from the centerline to a distance of about 0.2 r to 0.5 r, where r is the core radius.

It is preferred, for optical transmission fiber, that peak or maximum (optical) refractive index delta is $0.3\% < \Delta_{MAX} < 1.4\%$, the optical effective area at 1550 nm between 50 and 140 µm$^2$, preferably larger than 80 µm$^2$, more preferably between 80 and 120 µm$^2$, even more preferably between 80 and 110 µm$^2$. It is preferred, for optical laser fiber, that peak or maximum refractive index delta $\Delta_{MAX}$ is about $0.05\% < \Delta_{MAX} < 0.3\%$, the optical effective area at 1550 nm between larger than 140 µm$^2$, preferably larger than 150 µm$^2$, more preferably between 159 and 2000 µm$^2$. It is preferred, for optical DC (dispersion compensating) fiber, that peak or maximum (optical) refractive index delta is about $1\% < \Delta_{MAX} < 3\%$, the optical effective area at 1550 nm between larger than 20 µm$^2$, preferably larger than 30 µm$^2$, more preferably between 30 and 40 µm$^2$. It is preferred, for non-linear optical fiber that peak or maximum refractive index delta is about $1\% < \Delta_{MAX} < 3\%$, the optical effective area at 1550 nm is less than 40 µm$^2$.

As described above, SBS originates from the interaction between optical wave and acoustic wave. In a single optical fiber, the gain of SBS depends on the SBS spectrum and the overlap between the optical mode and acoustic modes. Thus, one way to reduce the overlap between the optical mode and acoustic modes by fiber profile designs is to allow the optical refractive index profile (optical delta profile) to remain the same, while changing the acoustic delta profile of the fiber.

Figure 2A:
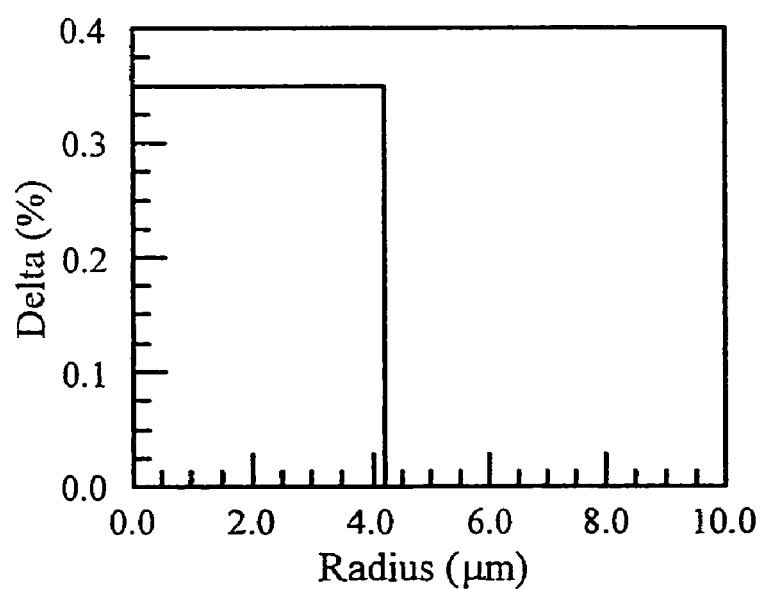
FIG. 2a illustrates the optical delta profile of a standard single mode optical fiber.
Figure 2B:
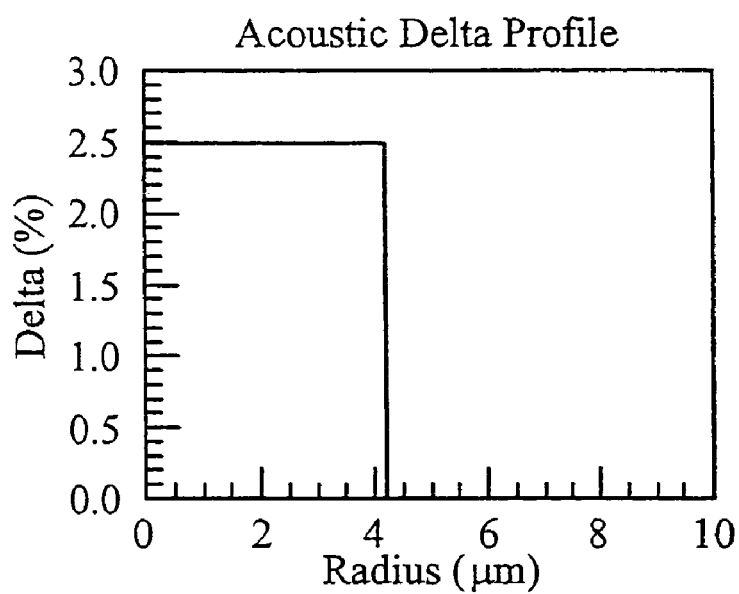
Figure 2C:
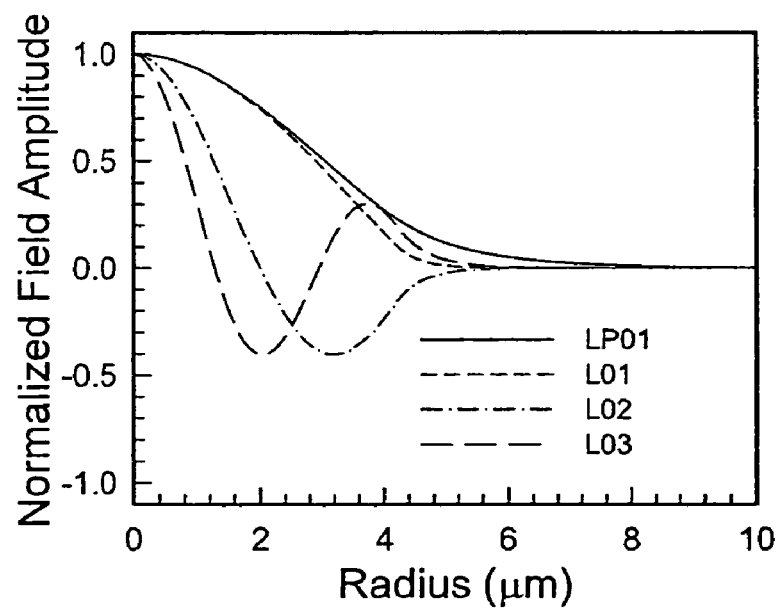

In order to form an acoustic waveguide within the fiber core, the longitudinal and shear acoustic velocities must be lower in the fiber core than in the cladding. This is normally the case for optical fibers with a typical Ge up-doped core without other co-dopants. For a standard single mode fiber, the optical delta profile is typically a step function as shown in FIG. 2A. The core of the fiber is doped with about 4.2 mol % Ge, which results in a relative refractive (i.e., optical) index delta % of 0.35%, relative to pure silica cladding (FIG. 2a). This positive relative refractive index delta corresponds to the optical waveguiding core. This standard single mode fiber has a MFD of 10.22 µm, effective area of 80.13 µm$^2$, and chromatic dispersion of 16.71 ps/(nm.km) at 1550 nm. The core delta is due to only Ge The core includes no other dopants. Because the interaction between the acoustic wave and optical wave is dominated by the longitudinal acoustic wave, in the following paragraphs, we discuss the longitudinal acoustic wave only. For acoustic waves, the relative longitudinal acoustic delta profile for this standard single mode fiber is shown FIG. 2B. FIGS. 2A and 2B illustrate that the longitudinal acoustic waves are guided inside the region of the same size as the size as the optical waveguiding core (i.e., within the radius of 4.0 µm), which results in a large overlap between the fundamental optical mode and lower order acoustic modes (and an overlap integral of about 0.97). Thus, this type of fiber has a relatively large amount of SBS. The confinement of the $LP_{01}$ optical field and several lowest orders of the longitudinal acoustic fields for this fiber are shown in FIG. 2C.

In order to reduce SBS, the optical fiber 10, according to some embodiments of the present invention utilizes, comprises at least one region of a silica-based core 12 that includes both the Ge and another updopant that increases acoustic velocity, for example, Aluminum. (See Eqs (19-20). For example, one of the core regions may have more than 0.1 mole % Aluminum and that an adjacent core region may have no Al or less than 0.1 mole % of Al. As stated above, both the Ge and Al increase the optical refractive index of the glass, but Al increases the longitudinal acoustic velocity and Ge decreases the longitudinal acoustic velocity. Thus, by utilizing the combination of Ge and Al, we can design fibers with the same optical refractive index profile as a typical transmission fiber (for example, standard single mode fiber) but different acoustic delta profile. Of course, other type of fibers may also be designed by utilizing the same approach to provide the same optical delta profile, while having a different acoustic delta profile and, therefore, improved SBS. These optical fibers include DC fibers, laser fibers, and non-linear optical fibers. It is noted that dopants other than Al may also be utilized, as long as they increase the longitudinal acoustic velocity, relative to that of silica glass.

Figure 3A:
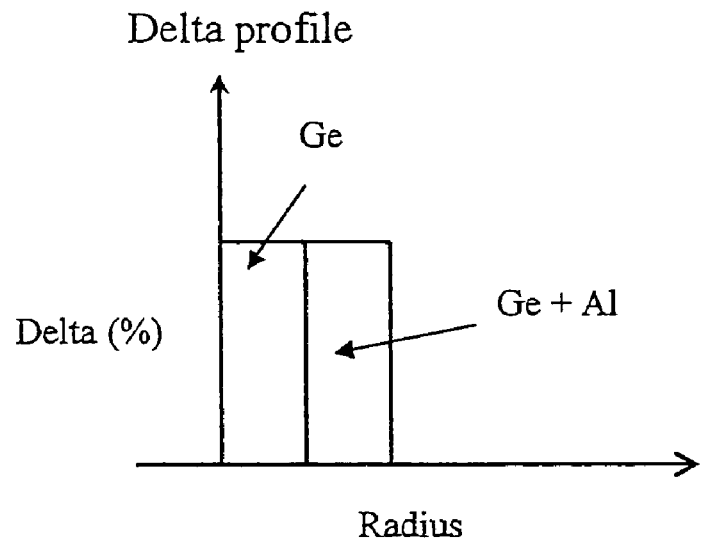
FIG. 3a illustrates schematically the optical delta profile of one embodiment of the reduced SBS single mode fiber.

FIG. 1 illustrates an optical fiber 10 according to one embodiment of the present invention. The optical delta profile of fiber 10 is the same as that of the standard single mode fiber in FIG. 2A, except that both Ge and Al are used in a region 12b surrounding the core region 12a. In this example, the dopant levels of Ge and Al are selected such that the refractive index is the same as the rest of the core (region 12a) that does not contain Al (is doped with Ge only). Because the optical delta profile of this fiber 10 is the same as that of standard single mode fiber (See FIG. 3a), the optical properties of this modified optical fiber 10 remain essentially the same as those for the standard single mode fiber.

Figure 3B:
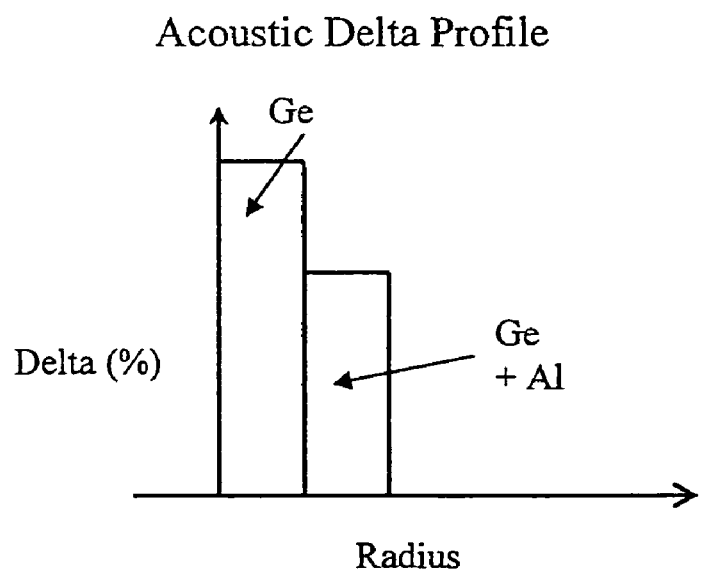

The longitudinal acoustic delta profile of the fiber 10 is illustrated in FIG. 3b. The longitudinal acoustic delta profile of the fiber 10 (corresponding to FIG. 3b) is very different from that of the standard single mode fiber that is doped with Ge only (shown in FIG. 2b). Because Al increases the acoustic velocity, the longitudinal acoustic delta is decreased in the region when Al is doped so that acoustic delta profile has a peak in the center, which guides the lower order acoustic modes within it. As a result, the overlap between the fundamental optical mode and lower order acoustic modes is reduced and the SBS threshold is increased. The SBS threshold of fiber 10 (corresponding to FIGS. 1 and 3a-3b) is increased from that of the standard single mode fiber. The approach for reducing SBS can be also applied to other more complicated segmented core designs, for example for NZDSF applications.

Thus, optical fiber 10 according to this embodiment present invention utilizes silica doped core that includes Aluminum and another codopant (index increasing co-dopant) such as Ge to form a narrower waveguide for the longitudinal acoustic field than for the optical field, so that the longitudinal acoustic field is much more confined near the center of the core (compared to the fiber with a core that does not include Al, or a similar material as a co-dopant). While the optical field is unaffected, the overlapping between the optical field and the longitudinal acoustic field is reduced, resulting in suppression of SBS effect and in increase in SBS threshold. The SBS threshold of an optical fiber is the highest total optical power that can transmit through the fiber.

EXAMPLE 1

Confining the Longitudinal Acoustic Field

Figure 4:
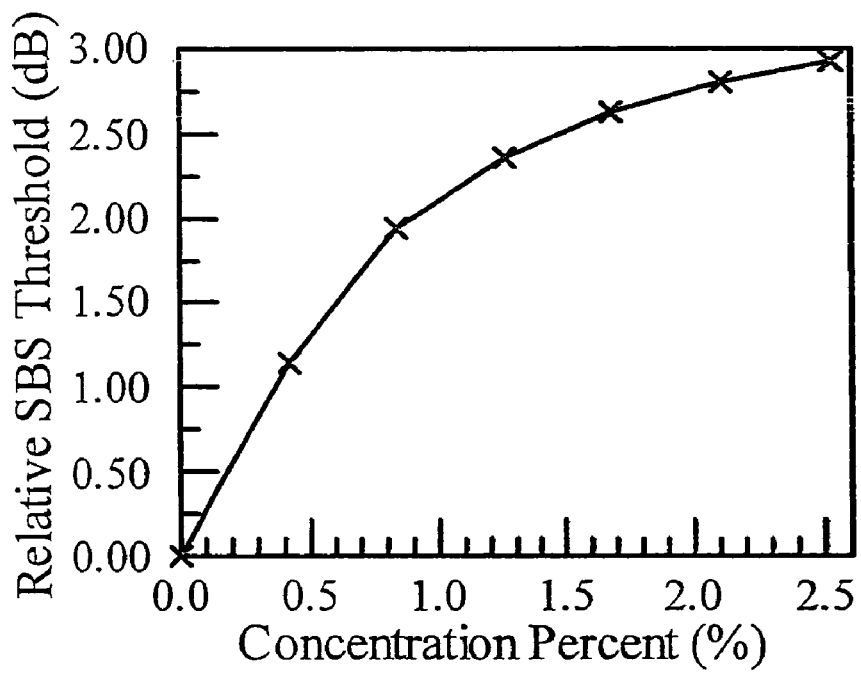
FIG. 4 is a graph of relative SBS threshold as a function of Al concentration level (mole percent), in the core region corresponding to the radius r between 2 µm and 4.2 µm.
Figure 5:
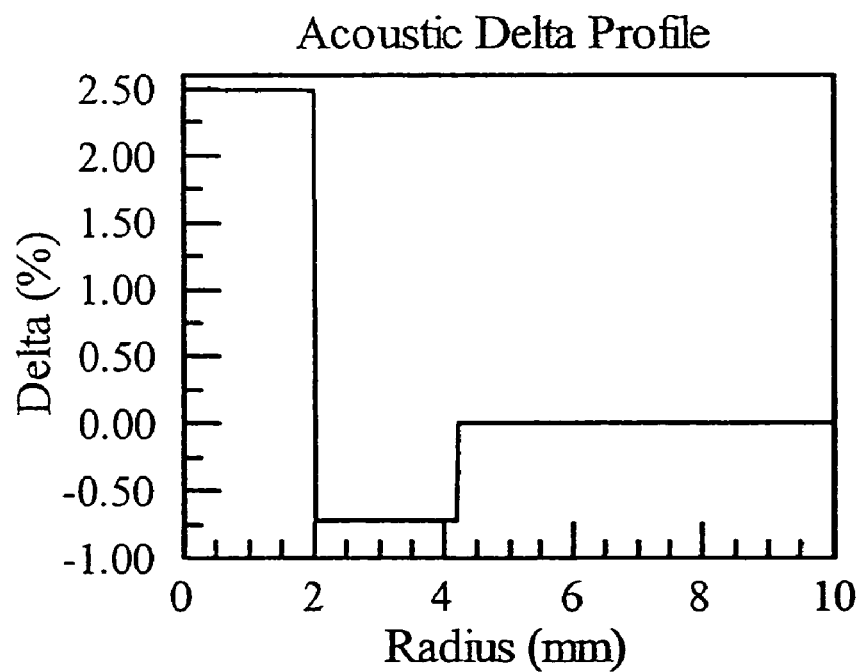
FIG. 5 illustrates acoustic delta profiles one embodiment of the optical fiber according to the present invention.
Figure 6:
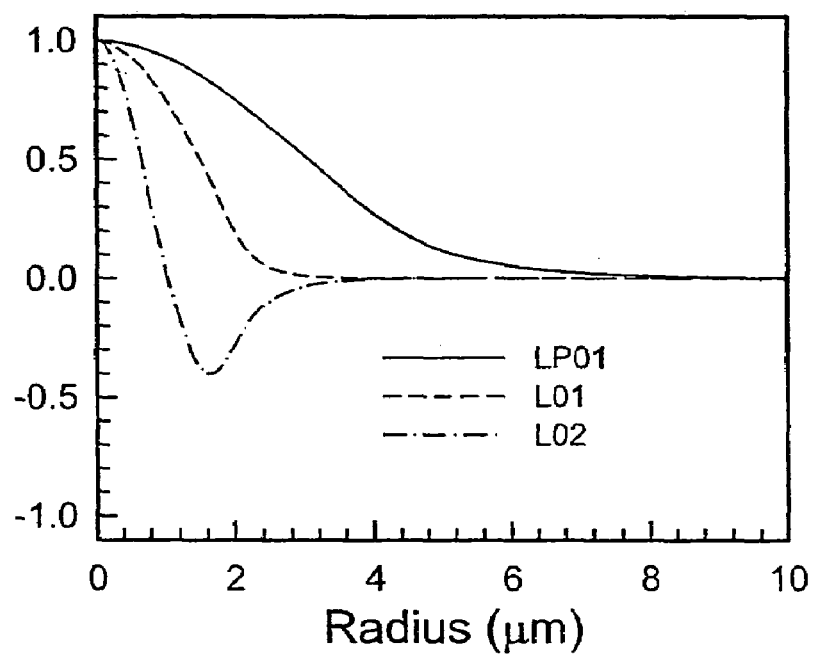
FIG. 6 is a plot of optical and longitudinal acoustic fields of the optical fiber that corresponds to the multi-step acoustic delta profile (dashed lines) of FIG. 5.

We will compare the performance of the exemplary fibers 10 with that of a standard single mode transmission fiber (fiber 1), i.e., the fiber that does not contain F. We then doped the core region 12b (r=2-4.2 μm) of the optical fiber 10 with varying level of the Al while maintaining the overall delta to be the same as that of the optical fiber doped with Ge only, so that the optical properties of the optical fiber, including MFD, effective area, and dispersion were essentially unchanged. The modeling results are summarized in Table 1. We found that as we increase the level of Al in the core region 12b, the SBS threshold relative to that in exemplary fiber 1 (standard single mode fiber corresponding to FIGS. 2A and 2B) increases monotonically, which is also illustrated in FIG. 4.

related acoustic field distribution. For example, the acoustic delta profile for the optical fiber 10 of the exemplary fiber 6 of Table 1 is shown in FIG. 5. We have found that, with the Aluminum co-doping, the acoustic delta decreases significantly. Therefore, the core region 12a (r<2 μm, in this example) forms a narrower waveguide for the acoustic field, while the optical fields still propagate through the same optical wave-guiding core 12. FIG. 6 illustrates the optical and acoustic fields as a function of fiber radius, for the exemplary fiber 6. We found that the $L_{01}$ acoustic field is essentially confined to the region of the core 12a with a radius of less than 2 microns, while the optical field is unchanged, which increases the figure of merit FOM that measures the SBS performance. The higher order acoustic fields are oscillating in nature. The overlap of such fields with the optical field (e.g., $LP_{01}$) is very small, because their positive contribution is largely cancelled by their negative contribution. For the optical fiber of example 6 the overlap integral is 0.51. The Pin Array bending and the lateral load bending loss for the optical fiber 10 of this example are 7.9 dB and 0.45 dB/km, respectively, at 1550 nm. This fiber has a cut-off wavelength at or below 1.3 μm.

EXAMPLE 2

Pushing the Acoustic Field Away from the Center

In this example, we explore another mechanism to reduce the SBS effect. Again, we use the Ge doped standard single mode fiber (FIGS. 2A and 2B) as a reference fiber. But in these exemplary embodiments we co-doped the central core region 12a (r=0 to 2.5 microns) with Al while leaving the surrounding core region 12b (the core region with the radius from 2.5 microns to 4.2 microns) unchanged. We found that as we increase the doping level of Aluminum in the region 12a

TABLE 1

| Case No. | 0-2 μm | | 2-4.2 μm | | L01 FOM | Power (P0) | Power Improvement (dB) | Overlap Integral |
|---|---|---|---|---|---|---|---|---|
| | GeO2 Delta (%) | Al Delta (%) | GeO2 Delta (%) | Al Delta (%) | | | | |
| 1 | 0.35 | 0 | 0.35 | 0 | 82.21 | 1.00 | 0.00 | 0.98 |
| 2 | 0.35 | 0 | 0.3 | 0.05 | 107.06 | 1.30 | 1.15 | 0.75 |
| 3 | 0.35 | 0 | 0.25 | 0.1 | 128.60 | 1.56 | 1.94 | 0.62 |
| 4 | 0.35 | 0 | 0.2 | 0.15 | 141.63 | 1.72 | 2.36 | 0.57 |
| 5 | 0.35 | 0 | 0.15 | 0.2 | 150.43 | 1.83 | 2.62 | 0.53 |
| 6 | 0.35 | 0 | 0.1 | 0.25 | 156.68 | 1.91 | 2.80 | 0.51 |
| 7 | 0.35 | 0 | 0.05 | 0.3 | 161.42 | 1.96 | 2.93 | 0.50 |

Figure 7:
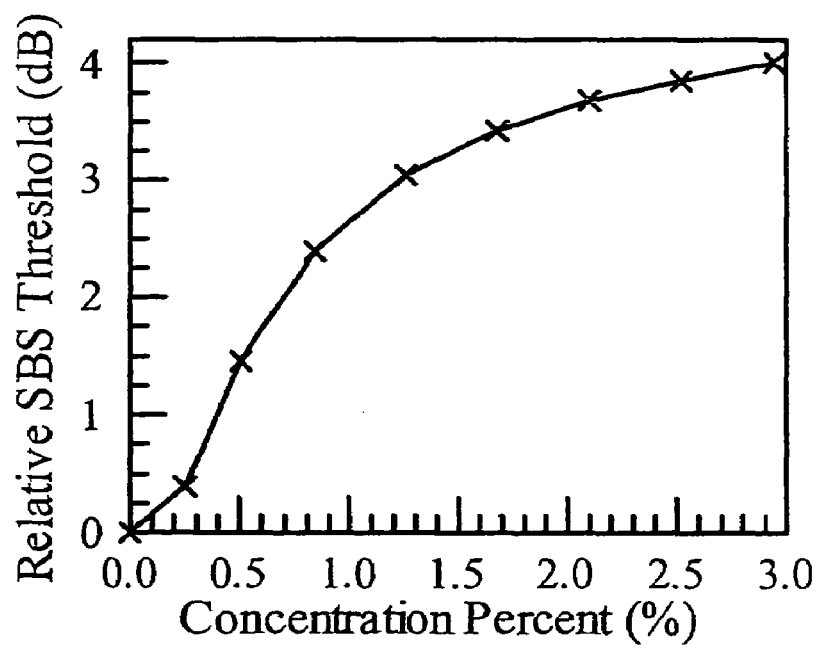
FIG. 7 is a graph of relative SBS threshold as a function of Al doping concentration level (mole percent), in the optical core region corresponding to the radius r between 0 and 2.5 µm.

The mechanism of the improvement of SBS threshold can be understood by looking at the acoustic waveguide and the as shown in Table 2, the SBS threshold increases monotonically as shown in FIG. 7.

TABLE 2

| Case No. | 0-2.5 μm | | 2.5-4.2 μm | | L01 FOM | Power (P0) | Power Improvement (dB) | Overlap Integral |
|---|---|---|---|---|---|---|---|---|
| | GeO2 Delta (%) | Al Delta (%) | GeO2 Delta (%) | Al Delta (%) | | | | |
| 1 | 0.35 | 0 | 0.35 | 0 | 82.21 | 1 | 0.00 | 0.98 |
| 8 | 0.35 | 0.03 | 0.35 | 0 | 89.96 | 1.09 | 0.39 | 0.89 |
| 9 | 0.35 | 0.06 | 0.35 | 0 | 114.82 | 1.40 | 1.45 | 0.70 |
| 10 | 0.35 | 0.1 | 0.35 | 0 | 142.82 | 1.74 | 2.40 | 0.56 |
| 11 | 0.35 | 0.15 | 0.35 | 0 | 165.74 | 2.02 | 3.05 | 0.48 |
| 12 | 0.35 | 0.2 | 0.35 | 0 | 180.84 | 2.20 | 3.42 | 0.44 |
| 13 | 0.35 | 0.25 | 0.35 | 0 | 191.57 | 2.33 | 3.67 | 0.42 |

TABLE 2-continued

| | 0-2.5 μm | | 2.5-4.2 μm | | | | Power | Overlap |
|---|---|---|---|---|---|---|---|---|
| Case No. | GeO2 Delta (%) | Al Delta (%) | GeO2 Delta (%) | Al Delta (%) | L01 FOM | Power (P0) | Improvement (dB) | Integral |
| 14 | 0.35 | 0.3 | 0.35 | 0 | 199.66 | 2.43 | 3.85 | 0.40 |
| 15 | 0.35 | 0.35 | 0.35 | 0 | 206.63 | 2.51 | 4.00 | 0.39 |

Figure 8:
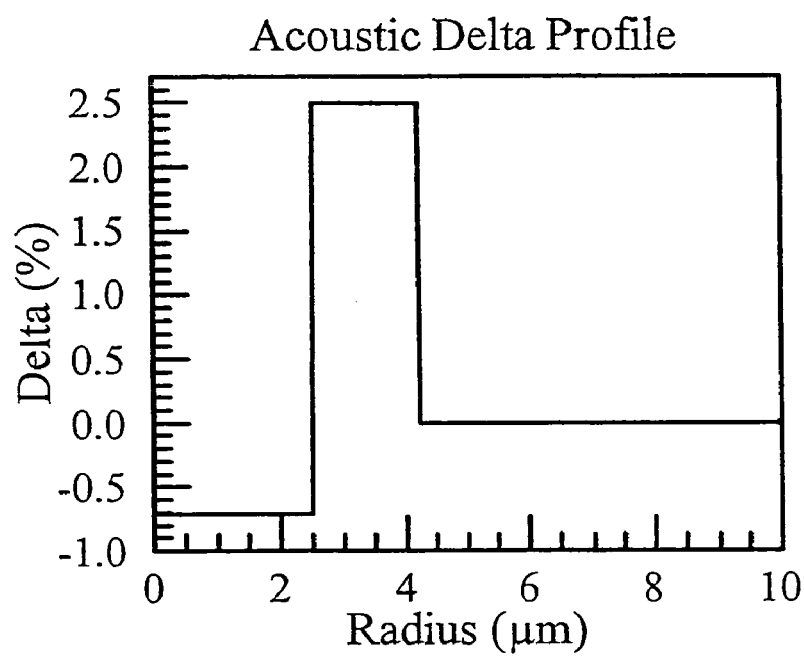
FIG. 8 illustrates acoustic delta profile of a standard single mode fiber and of another embodiment of the optical fiber according to the present invention.
Figure 9:
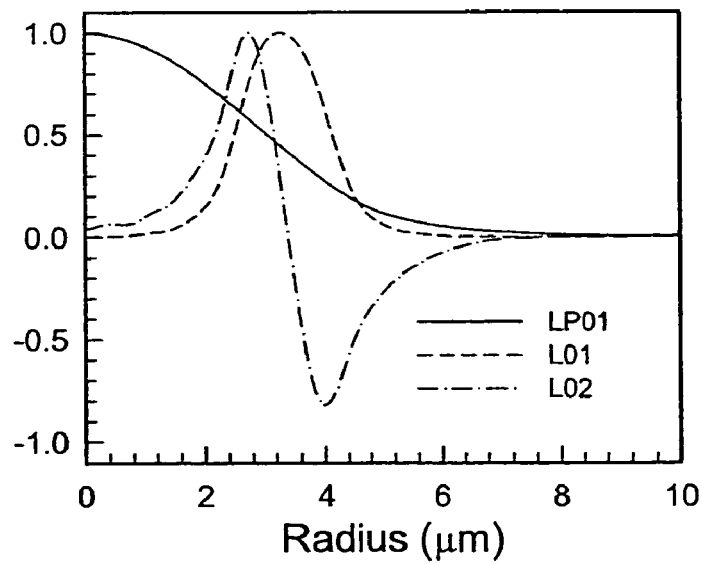
FIG. 9 is a plot of optical and longitudinal acoustic fields of the optical fiber that corresponds to the multi-step acoustic delta profile of FIG. 8.

The mechanism of the improvement of SBS threshold by co-doping a core region that is centermost core region can be understood by looking at the acoustic waveguide and the related field distribution of the optical fiber examples depicted in Table 2. For example, the acoustic delta profile for the optical fiber 10 of the exemplary fiber #12 of Table 1 is shown in FIG. 8. We have found that, with the Aluminum co-doping in the core region 12a, the acoustic delta decreases significantly. Therefore, acoustic delta of the core region 12a (r=0 to 2.5 microns) is depressed relative to that of the region 12b (r=2.5 to 4.2 microns), while the optical fields still propagate the width of the optical waveguiding core 12. This acoustic delta profile would result in the fundamental acoustic field being pulled away from the center of the fiber core 12. FIG. 9 illustrates optical and acoustic fields as a function of fiber radius. We found that the $L_{01}$, acoustic field is pushed away from the center of the core towards the edge of the core 12, while the optical field is unchanged. Since the optical field is mostly near the center of the fiber (i.e., in the core region 12a), by moving the fundamental acoustic field away from the center of the fiber core, we reduce the overlap between the $LP_{01}$ and $L_{01}$ fields and increase the FOM that measures the SBS performance. The higher order acoustic fields are oscillating in nature. The overlap of such fields with the optical field (e.g., $LP_{01}$) is very small, because their positive contribution is largely cancelled by their negative contribution. For the optical fiber of optical fiber example #12 from Table 2 the overlap integral is 0.44. The Pin Array bending and the lateral load bending loss for the optical fiber 10 of this example are 7.9 dB and 0.45 dB/km, respectively, at 1550 nm. The optical fiber examples of Table 2 have a cut-off wavelength at or below 1.3 μm.

In the above examples, we have used a multiple step acoustic delta profile to illustrate that doping at least one core region with at least two dopants, while leaving one core region doped with a single updopant, such as Ge, for example, improves the SBS threshold of optical fibers 10. Preferably, the two regions 12a and 12b are adjacent to one another, and because the acoustic delta profile is a multistep profile, the longitudinal acoustic wave velocities within the two core 12a and 12b regions differ, preferably by at least 0.2%.

For example, the central core region 12a may include Ge and Al co-doped silica and the adjacent core region 12b surrounding the central core region 12 a may includes only Ge doped silica. Alternatively, the central core region 12a may include Ge doped silica only and the adjacent core region 12b surrounding the central core region includes Ge and Al co-doped silica and does not include Al doped silica Alternatively, the optical fiber may have at a least two adjacent regions 12a and 12b that are both doped with wit Ge and Al, but the amounts of Ge and Al should be different in these two regions, so that longitudinal acoustic wave velocities within the two core regions 12a and 12b differ, preferably by 0.2%. Such fibers 10 have a reduced overlap integral of less than 0.8 at 1550 nm. Preferably, the overlap integral is less than 0.65. More preferably, the overlap integral is less than 0.5.

In actual manufactured fibers, the boundary between different regions 12a and 12b would not be as sharp as shown in the above examples. However, the approach for minimizing SBS will still work. For a skilled person in the art, the adjustment can be made in a straightforward way to accommodate those situations. Additional fiber core regions $12_i$ may also be added as long as the at least one of the core regions is codoped with both Ge and Al, or other similar dopants.

EXAMPLE 3

Large Effective Area NZDSF Fibers

Figure 10:
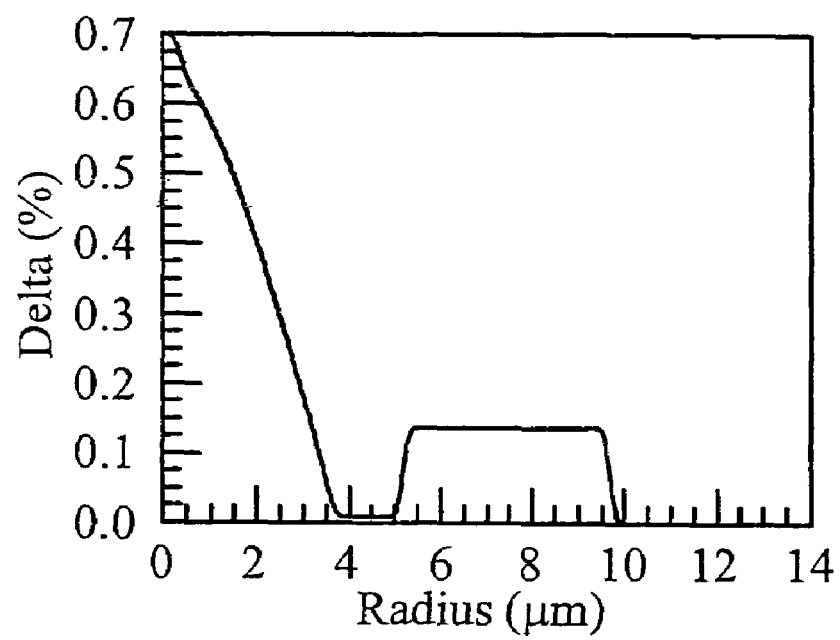
FIG. 10 illustrates the optical delta profile a standard non zero dispersion shifted fiber (NZSDSF)
Figure 11:
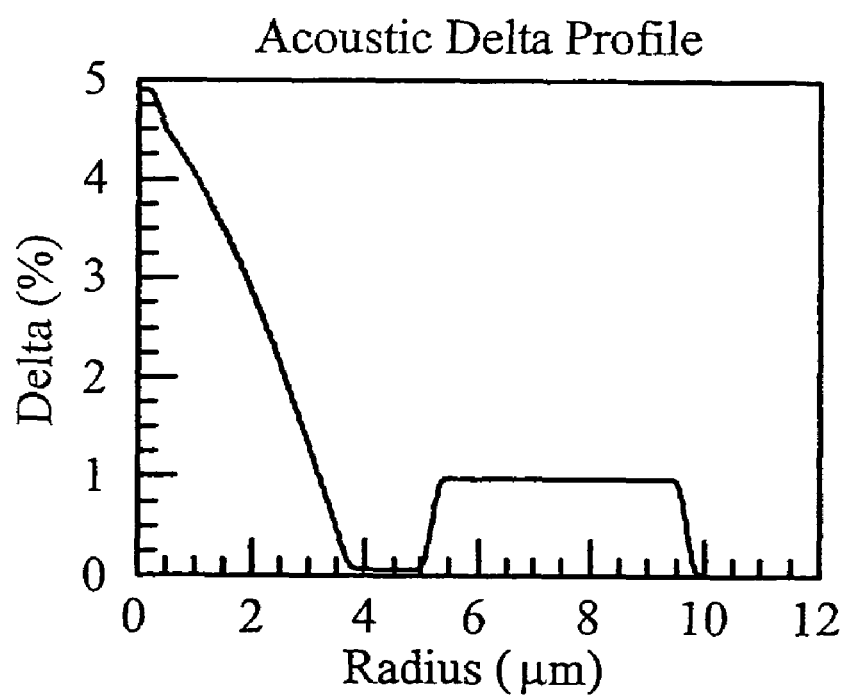
FIG. 11 illustrates the longitudinal acoustic delta profile of the optical fiber with the optical delta profile shown in FIG. 10.
Figure 12:
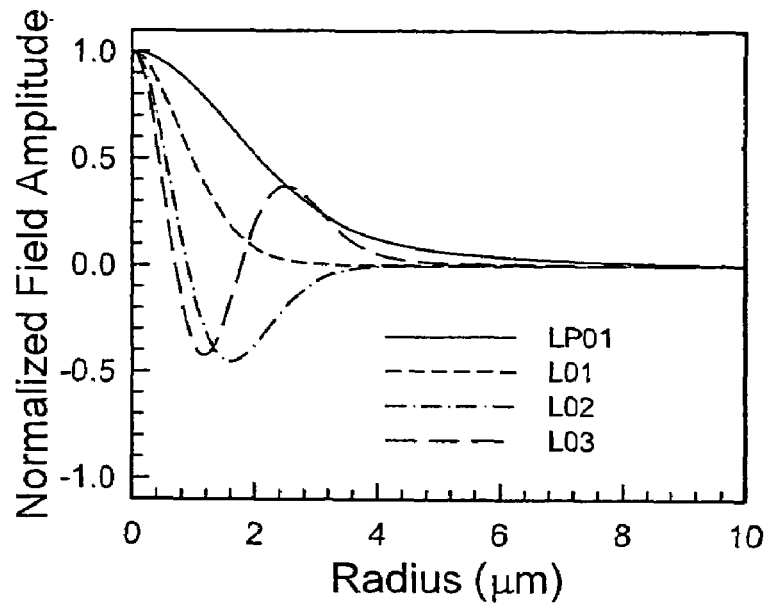
FIG. 12 is a plot of optical and longitudinal acoustic fields of the optical fiber that corresponds to the optical fiber corresponding to FIGS. 10 and 11.

The optical delta profile and acoustic delta profile of a typical large area NZDSF fiber is shown in FIGS. 10 and 11 respectively. This fiber has a dispersion of 4.1 ps/nm/km at 1550 nm, Kappa of 48 nm at 1550 nm, dispersion of −5.73 ps/nm/km at 1310 nm, zero dispersion around 1500 nm, MFD of 9.82 μm at 1550 nm, MFD of 7.61 μm at 1310 nm, effective area of 72.52 μm² at 1550 nm. This fiber has an acoustic FOM of 114.35 μm². The optical field and longitudinal acoustic fields of this fiber are shown in FIG. 12.

Figure 13:
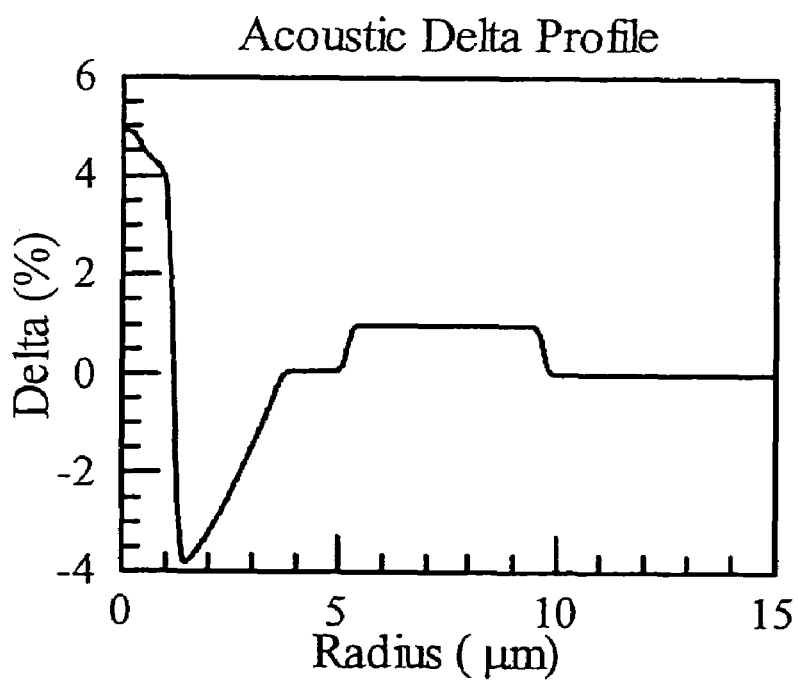
FIG. 13 illustrates the longitudinal acoustic delta profile of an embodiment of the optical fiber according to the present invention, that has the optical delta profile shown in FIG. 10.
Figure 14:
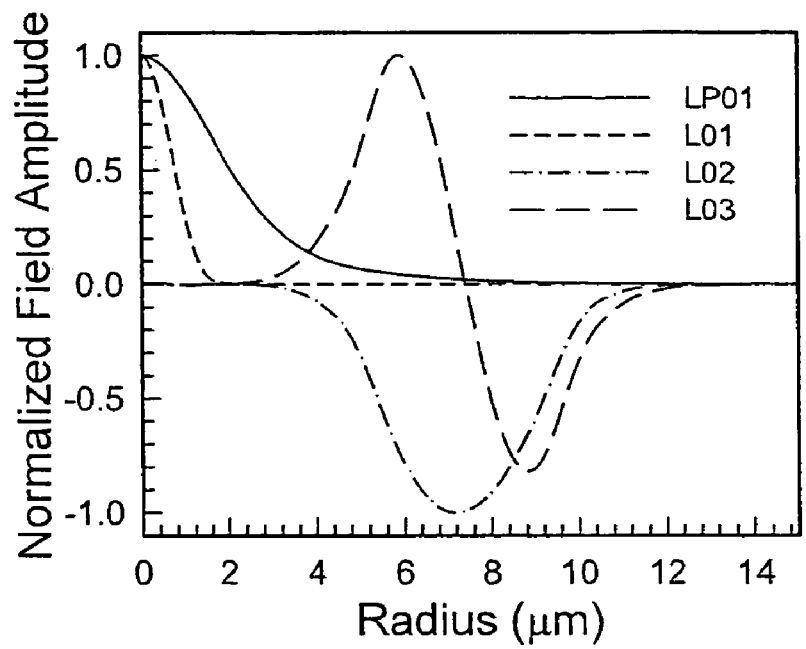
FIG. 14 is a plot of optical and longitudinal acoustic fields of the embodiment of the optical fiber that corresponds to the multi-step acoustic delta profile of FIG. 13.

Now, we consider a case when Al dopant is added. Since both Ge and Al are up-dopant, we can not add Al arbitrarily. Al can only be added in the region where there is already positive delta. In this example, we have Al doped at a radial region of the core between radii of 1.2 to 3.7 microns, to contribute to most of the overall delta in this core region, and the Ge amount was correspondingly adjusted so that the overall optical delta profile was maintained the same as that shown FIG. 11. The optical properties of this exemplary optical fiber 10 (such as the dispersion, MFD and optical effective area) are similar to the fiber when the positive delta was due only to Ge doping. However, the acoustic delta profile has been changed. The acoustic delta profile of the altered fiber 10 is shown in FIG. 13. This optical fiber 10 has FOM of 212.37 mm² ($L_{01}$) and 219.9 mm² ($L_{02}$). The SBS threshold is improved from the fiber without Al doping by a factor of 1.86 or by 2.69 dB. The optical field $LP_{01}$ and longitudinal acoustic fields of this exemplary fiber 10 are shown in FIG. 14. It is seen that with the introduction of Al doping in one core region away from the central core, the optical field is unchanged, but the $L_{01}$ longitudinal acoustic field is confined to a much narrower region near the fiber center (i.e., core region 12a). The optical fiber 10 of this example has the Pin Array bending loss and the lateral load bending loss of 7.5 dB and 2.4 dB/km, respectively, at 1550 nm. This fiber has a cut-off wavelength at or below 1.7 μm and a cable cutoff of 1.5 μm.

EXAMPLE 4

Laser Fiber

Figure 15:
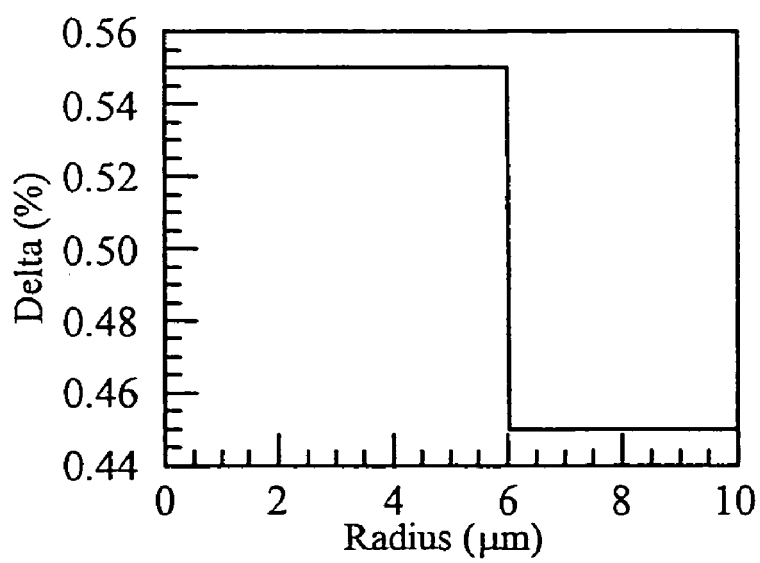
FIG. 15 illustrates the optical delta profile an optical laser fiber.
Figure 16:
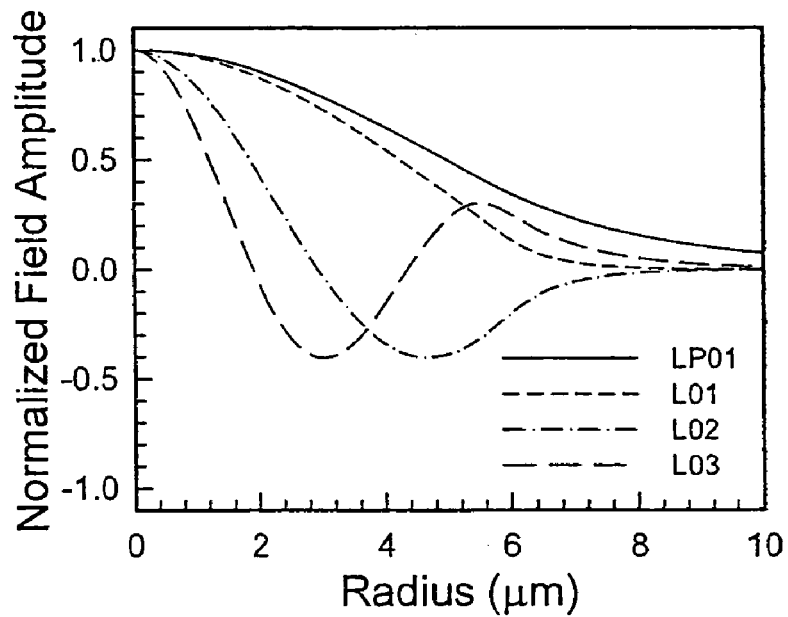
FIG. 16 is a plot of optical and longitudinal acoustic fields of the optical laser fiber that corresponds to the optical laser fiber that has optical delta profile of FIG. 15.

A silica-based laser fiber with 0.1% delta between the core and the cladding has an optical delta-profile shown in FIG. 15. In this optical fiber, both the core and the cladding of are doped with Ge. The optical fiber core is also co-doped with a small amount of rare earth material, for example Nd, Tm, Er and/or Yb to provide amplification. However, no other codopants are present in the core. This optical fiber has a MFD of 19.1 μm at 1550 nm and an, optical effective area of 271.2 μm². The FOM of the $L_{01}$ mode that measures the SBS performance is 296.9 μm². The optical field and the longitudinal acoustic fields of this laser fiber are shown in FIG. 16. More specifically, FIG. 16 illustrates that the optical field (LP01) and the acoustic field (L01) have an almost total overlap (i.e., there is very little area of no overlap) and both fields are spread over the entire width of the optical fiber core.

Figure 17:
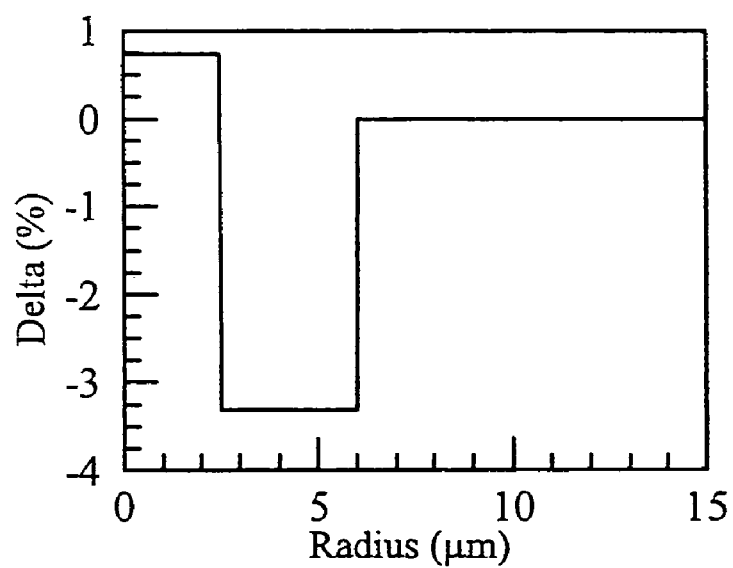
FIG. 17 illustrates the longitudinal acoustic delta profile of the optical fiber according to an embodiment of the present invention that has the optical delta profile shown in FIG. 15.
Figure 18:
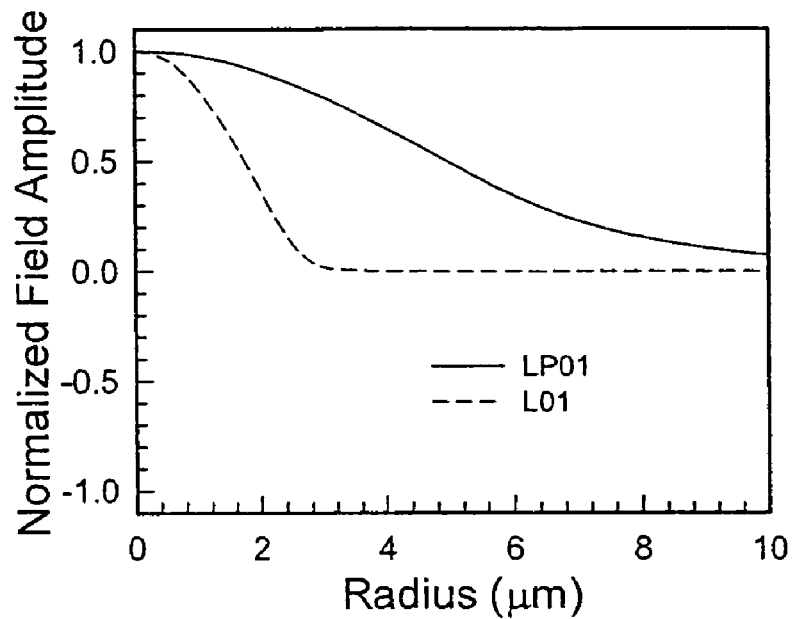
FIG. 18 is a plot of optical and longitudinal acoustic fields of the embodiment of the optical fiber that corresponds to acoustic delta profile of FIG. 17.

We then modified the composition of the fiber core by co-doping the Al in the core region 12*b* (radius 2.5 to 6.0 μm) with Al. The amount of Al contributes to optical refractive index delta by 0.3% delta, and the Ge concentration in the core region 12*b* was adjusted to provide 0.25 delta % to maintain the overall optical delta profile. That is, the resultant fiber 10 still has the original optical delta profile shown in FIG. 15. The acoustic delta profile of the resultant fiber 10 is shown in FIG. 17. FIG. 17 illustrates an acoustic delta profile that has a dip in the core region 12*b*. That is, the resultant laser fiber 10 has a narrow and deep acoustic waveguide in the center of the core for the acoustic field, improving the SBS threshold. The multi-step acoustic delta profile of FIG. 17 accounts for different acoustic velocities between the core regions 12*a* and 12*b*. It is preferable that the acoustic velocities between two adjacent core regions differ by more than 100 m/s, more preferably by more than 200 m/s. The velocities in the core regions 12*a* and 12*b* of the optical laser fiber 10 of this example differ by around 228.9 m/s with the longitudinal acoustic velocity in the core region 12*a* being 5899 m/s and that in core region 12*b* being 6140.2 m/s. Optical laser fiber 10 of this example has a FOM of 956.9 μm², which suggests that the SBS threshold has been increased by a factor of 3.22 or 5.08 dB. The optical fields and the acoustic fields of this laser fiber 10 (with the optical and acoustic delta profiles shown in FIGS. 15 and 17) are illustrated in FIG. 18. FIG. 18 illustrates that the optical field (LP01 mode) occupies the entire core 12, while the acoustic field L01 is confined to the core region 12*a*, minimizing the overlap between the optical and acoustic fields.

Alternatively, we can also dope Al in the central core region of the laser fiber, for example, with Al contributing 0.25% delta between 0 and 4.0 μm². The FOM becomes 697.25 μm². The SBS threshold can be improved from the fiber shown in FIG. 15 without Al doping by a factor of 2.35 or 3.7 dB.

We can also modify the laser fiber to have a larger core diameter. For example, if the core diameter is changed to 25 μm², without the doping of Al, the optical laser fiber has a MFD of 22.8 μm, effective area of 437 μm² and FOM of 436 μm² at 1550 nm. We then modified the composition of the fiber core by co-doping the Al in the core region 12*b* (radius 4.0 to 8.0 μm) with Al. The Al dopant contributes to optical refractive index delta by 0.3% delta, and the Ge concentration in the core region 12*b* was adjusted to provide 0.25 delta %, to maintain the overall optical delta profile. While the MFD and optical effective area were not changed, the FOM changed to 1864 μm². The SBS threshold was increased by a factor of 4.27 or 6.3 dB.

EXAMPLE 5

Optical Fiber with Matched Acoustic Velocities Between the Core and the Cladding According to another embodiment of the present invention the optical fiber 10 has a core 12 and the cladding 14 doped such that longitudinal acoustic velocities within the core and the cladding are matched. When the longitudinal acoustic velocities within the core and the cladding of the optical fiber 10 are the same or almost the same (i.e., matched) we achieve very good SBS improvement.

Again, for comparison purposes, we consider an optical fiber with a simple step-index optical delta profile shown in FIG. 2*a*. As stated above, This optical fiber has a MFD of 10.22 μm, effective area of 80.13 μm², chromatic dispersion of 16.71 ps/(nm.km) at 1550 nm and FOM is 82.2 μm².

Figure 19:
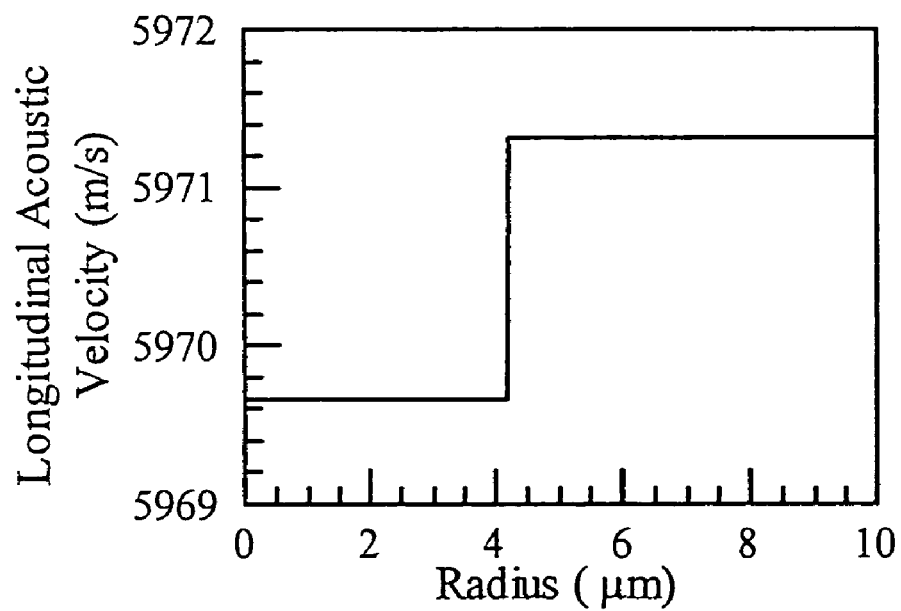
Figure 20:
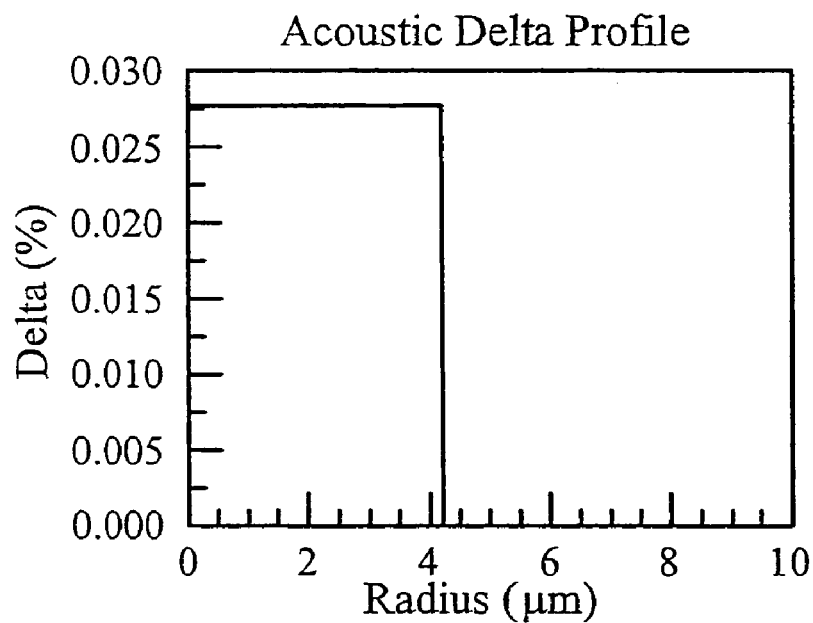
FIG. 20 illustrates the longitudinal acoustic delta profile of the optical fiber that corresponds to the plot of FIG. 19.

We then modified the composition of this optical fiber to create new exemplary fiber 10, by doping the core with Al to provide 0.2925% delta (due to Al only), and by doping the cladding with Al to provide 0.1% delta contribution, while maintaining the overall optical delta profile to be the same as that in FIG. 2*a*. This exemplary optical fiber 10 has the FOM of 196.7 μm², which is a factor of 2.39 or 3.79 dB improvement in SBS threshold. Preferably, the acoustic velocities between the core and the cladding of this type of fiber 10 are different no more than 0.3% and more preferably by no more than 0.1% and most preferably by no more than 0.05%. Also preferably, difference between the core acoustic velocity $v_1$ and the cladding acoustic velocity $v_2$ (i.e., $|v_1-v_2|$) for this type of fiber 10 is no more than 60 m/s, preferably, less than 25 m/s, more preferably less more than 10 m/s, even more preferably less than 5 m/s and most preferably less than 3 m/s. A typical range for $v_1-v_2$ is between −5 m/s and 60 m/s. In this exemplary optical fiber 10, the longitudinal velocities of the core and the cladding are matched to be within about 2 m/s of one another (FIG. 19). The close match of acoustic velocities is also illustrated in the acoustic delta profile of FIG. 20, which shows acoustic delta % of the core (relative to the cladding) of about 0.0275% In order to improve the SBS threshold significantly, the match between the core and cladding in terms of longitudinal velocity or acoustic delta must be very close. For example, if we change the Al concentration in the cladding such that it contributes to 0.291 delta %, the FOM changes to 117.75 μm², and the improvement of the SBS threshold is a factor of 1.43 or 1.56 dB.

EXAMPLE 6

Optical Fiber with Smooth Change of Al Doping Level

Figure 21:
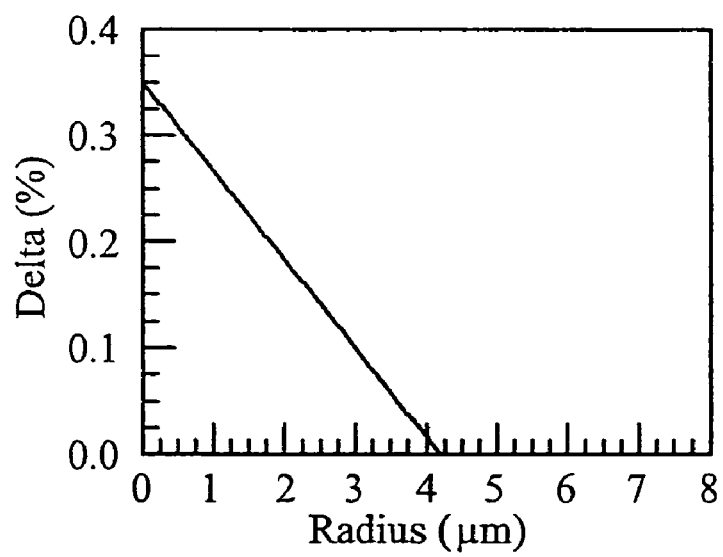
FIG. 21 is an optical refractive delta % contribution due to Al dopant in the fiber core of another exemplary fiber.
Figure 22:
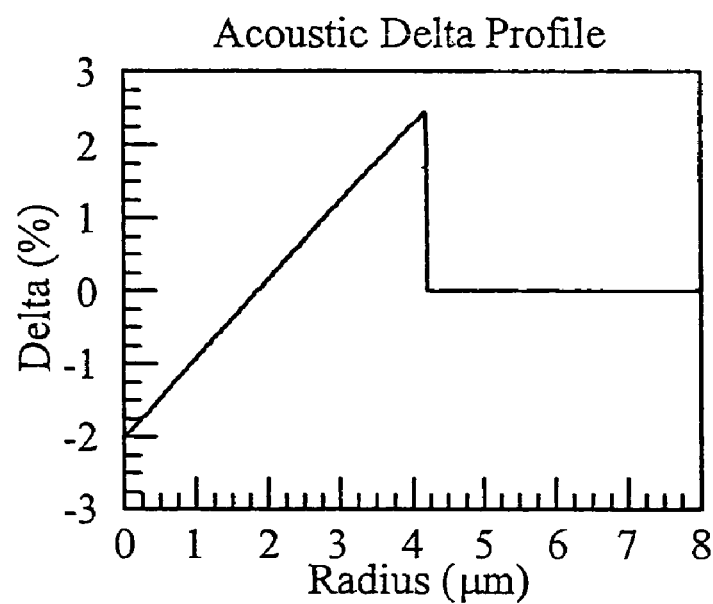
FIG. 22 is an acoustic delta profile of the optical fiber corresponding to FIG. 21.
Figure 23:
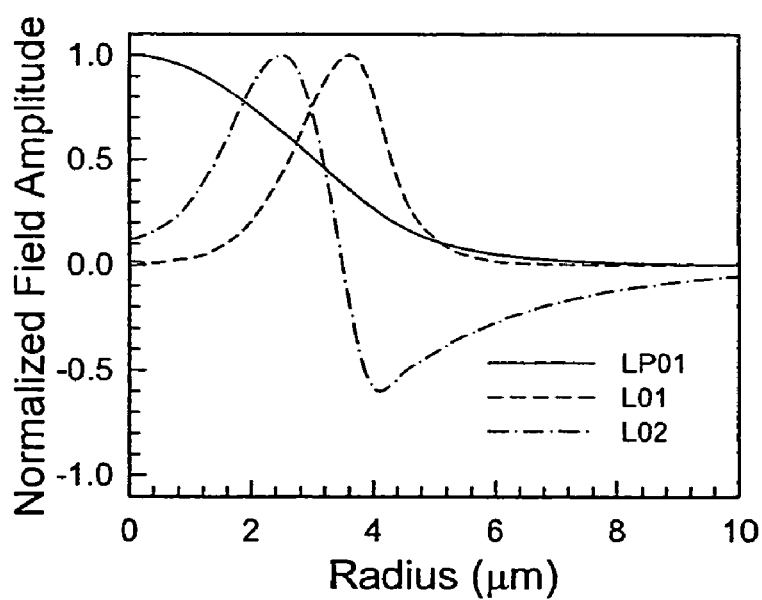
FIG. 23 is a plot of optical and longitudinal acoustic fields of the optical fiber that corresponds to the optical fiber corresponding to FIGS. 21 and 22.

According to another embodiment of the present invention the optical fiber 10 has a core 12 and the cladding 14 doped such that the dopant level of Al does not change abruptly between the adjacent regions, but undergoes very smooth change. However, one can find at least 2 core regions with a different amount of Al dopant, and thus different acoustic velocities. In this example, we consider the optical fiber 10 that has the optical delta profile of FIG. 2*a*, but has an Al doped core. In this example, the level of Al is changed linearly from the center of the core 12, to the edge of the core. The optical Delta % contribution due to changing Al concentration of this optical fiber is depicted in FIG. 21. The acoustic delta profile of this fiber is shown in FIG. 22. The lower value of the acoustic delta near the center of the core 12 helps to push the acoustic field away from the center of the core, resulting in reduction of the overlap between the LP01 optical field and the acoustic fields. The FOM of this modified optical fiber 10 is 191.7 μm², which is a factor of 2.33 or 3.68 dB improvement over that is purely doped with Ge. The optical field and acoustic fields are shown in FIG. 23. It is found that the fundamental acoustic field is pushed away from the center of the core while the LP01 remains in the center of the core.

Preferably, the optical fiber disclosed herein has a silica-based core and cladding. In preferred embodiments, the cladding has an outer diameter of about 125 μm. Preferably, the outer diameter of the cladding has a constant diameter along the length of the optical fiber. In preferred embodiments, the refractive index of the optical fiber has radial symmetry.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description, serve to explain the principals and operation of the invention. It will become apparent to those skilled in the art that various modifications to the preferred embodiment of the invention as described herein can be made without departing from the spirit or scope of the invention as defined by the appended claims.

What is claimed is:

1. An optical fiber comprising:
   a core having a refractive index profile and a centerline; and
   a cladding layer surrounding and directly adjacent the core;
   wherein core includes updoping material and is doped with Al in at least one region of the core, such that either:
   (a) the longitudinal acoustic wave velocity within the core is within 0.05% of the longitudinal acoustic wave velocity within the cladding; or
   (b) the acoustic wave velocity in the core changes by at least 0.2%, and the core has essentially symmetrical acoustic delta profile.

2. The optical fiber according to claim 1, wherein said cladding layer is Al doped silica cladding.

3. The optical fiber according to claim 1, wherein said cladding layer is a pure silica layer.

4. The optical fiber according to claim 1, wherein said two adjacent core regions have the same refractive index.

5. The optical fiber according to claim 1, wherein said core has a maximum acoustic index delta, and a minimum acoustic index delta, and the difference therebetween is 9%.

6. The optical fiber according to claim 1, wherein said core has a maximum acoustic index delta of at least 2.5%.

7. An optical fiber comprising:
   a core having a refractive index profile and a centerline; and
   a cladding layer surrounding and directly adjacent the core;
   wherein the core includes at least two adjacent core regions and at least one of said core regions is doped with Ge and Al, such that the longitudinal acoustic wave velocities within the two core regions differ by at least 0.2% and the core has essentially symmetrical acoustic delta profile.

8. An optical fiber comprising:
   a core having a refractive index profile and a centerline; and
   a cladding layer surrounding and directly adjacent the core;
   wherein core includes updoping material and is doped with Al in at least one region of the core, such that either:
   (a) the longitudinal acoustic wave velocity within the core is within 0.05% of the longitudinal acoustic wave velocity within the cladding; or
   (b) the longitudinal acoustic wave velocity in the core changes by at least 0.2% wherein one of said core regions includes Ge doped silica and the adjacent core region includes Ge and Al doped silica.

9. The optical fiber according to claim 8, wherein the central core region includes Ge doped silica and the adjacent core region surrounding the central core region includes Ge and Al doped silica.

10. The optical fiber according to claim 8, wherein the central core region includes Ge and Al co-doped silica and the adjacent core region surrounding the central core region includes Ge doped silica and does not include Al doped silica.

11. The optical fiber according to claim 8, wherein said one core region and said adjacent core region are doped with both Ge and Al, herein the amounts of Ge and Al are different in these two regions.

12. An optical fiber comprising:
   a Al doped core having a refractive index profile and a centerline, the core comprising a first region having an acoustic delta $\Delta_1$ and a second region directly adjacent the first region and having an acoustic delta $\Delta_2$ wherein $\Delta_1$ does not equal to $\Delta_2$, said two core regions having a substantially equal optical relative refractive index, and
   a cladding layer surrounding and directly adjacent the core;
   wherein one of first region has more than 0.1 mole % Al and said second region has less than 0.1 mole % of Al, and at least one of said regions is co-doped with G and Al.

13. An optical fiber comprising:
   a core having a refractive index profile and a centerline; and
   a cladding layer surrounding and directly adjacent the core;
   wherein core includes updoping material and is doped with Al in at least one region of the core, such that either:
   (a) the longitudinal acoustic wave velocity within the core is within 0.05% of the longitudinal acoustic wave velocity within the cladding; or
   (b) the longitudinal acoustic wave velocity in the core changes by at least 0.2% wherein said first region has an outer radius of no more than 3 μm and said second region has a radius of not less than 2 μm.

14. An optical fiber comprising:
   a core having a refractive index profile and a centerline; and
   a cladding layer surrounding and directly adjacent the core;
   wherein core includes updoping material and is doped with Al in at least one region of the core, such that either:
   (a) the longitudinal acoustic wave velocity within the core is within 0.05% of the longitudinal acoustic wave velocity within the cladding; or
   (b) the longitudinal acoustic wave velocity in the core changes by at least 0.2% wherein said first region has an outer radius of no more than 0.5 of the fiber core radius and said second region has an outer radius greater than 0.5 of the fiber core radius.

15. An optical fiber comprising:
   a core having a refractive index profile and a centerline; and
   a cladding layer surrounding and directly adjacent the core;
   wherein core includes, in at least one region of the core, updoping material and another updopant material capable of increasing acoustic velocity, such that either:
   (a) the longitudinal acoustic wave velocity within the core is within 0.05% of the longitudinal acoustic wave velocity within the cladding; or
   (b) the core includes at least two adjacent core regions, such that the longitudinal acoustic wave velocities within the two core regions differ by at least 0.2% and the core has essentially symmetrical acoustic delta profile.

16. An optical fiber comprising:
   a core having a refractive index profile and a centerline; and
   a cladding layer surrounding and directly adjacent the core;

wherein core includes updoping material and is doped with Al in at least one region of the core, such that either:
  (a) the longitudinal acoustic wave velocity within the core is within 0.05% of the longitudinal acoustic wave velocity within the cladding; or
  (b) the longitudinal acoustic wave velocity in the core changes by at least 0.2%, wherein Al dopant level is changed linearly within said core.

17. An optical fiber comprising:
a core having a refractive index profile and a centerline; and
a cladding layer surrounding and directly adjacent the core;
wherein core includes updoping material and is doped with Al in at least one region of the core, such that either:
  (a) the longitudinal acoustic wave velocity within the core is within 0.05% of the longitudinal acoustic wave velocity within the cladding; or
  (b) the longitudinal acoustic wave velocity in the core changes by at least 0.2%, wherein concentration of Al within said core is continually and smoothly reduced toward the core's edge.

18. The optical fiber according to claim 17, wherein said core is characterised by acoustic delta, and said acoustic delta is continually and smoothly increased toward the core's edge.

19. The optical fiber according to claim 18, wherein said core has a step-shaped optical delta profile.

20. The optical fiber according to claim 17, wherein said core has a maximum acoustic index delta, and a minimum acoustic index delta, and the difference therebetween is 9%.

21. The optical fiber according to claim 17, wherein said core has a maximum acoustic index delta of at least 2.5%.

22. An optical fiber comprising:
a core having a refractive index profile and a centerline; and
a cladding layer surrounding and directly adjacent the core;
wherein core includes updoping material and is doped with Al in at least one region of the core, such that either:
  (a) the longitudinal acoustic wave velocity within the core is within 0.05% of the longitudinal acoustic wave velocity within the cladding; or
  (b) the longitudinal acoustic wave velocity in the core changes by at least 0.2% wherein said core is characterised by acoustic delta, and said acoustic delta is concentration of Al within is continually and smoothly increased toward the core's edge.

* * * * *